(12) United States Patent
Kramer et al.

(10) Patent No.: US 11,600,421 B2
(45) Date of Patent: *Mar. 7, 2023

(54) LAMINATE WITH INDUCTION COILS

(71) Applicant: THE DILLER CORPORATION, Cincinnati, OH (US)

(72) Inventors: Robert Jacob Kramer, Franklin, OH (US); Kevin Francis O'Brien, Cincinnati, OH (US)

(73) Assignee: THE DILLER CORPORATION, Cincinnati, OH (US)

( * ) Notice: Subject to any disclaimer, the term of this patent is extended or adjusted under 35 U.S.C. 154(b) by 960 days.

This patent is subject to a terminal disclaimer.

(21) Appl. No.: 15/488,417

(22) Filed: Apr. 14, 2017

(65) Prior Publication Data

US 2018/0301267 A1     Oct. 18, 2018

(51) Int. Cl.

| H01F 27/02 | (2006.01) |
|---|---|
| H02J 50/10 | (2016.01) |
| H02J 50/12 | (2016.01) |
| H01F 27/28 | (2006.01) |
| H01F 27/32 | (2006.01) |
| H01F 38/14 | (2006.01) |
| H02J 7/00 | (2006.01) |

(52) U.S. Cl.
CPC ....... *H01F 27/022* (2013.01); *H01F 27/2804* (2013.01); *H01F 27/327* (2013.01); *H01F 38/14* (2013.01); *H02J 7/0042* (2013.01); *H02J 50/10* (2016.02); *H02J 50/12* (2016.02); *H01F 2027/2809* (2013.01)

(58) Field of Classification Search
CPC ......... H01F 1/14775; H01F 2027/2809; H01F 27/022; H01F 27/2804

USPC .................................................. 336/200, 232
See application file for complete search history.

(56) References Cited

U.S. PATENT DOCUMENTS 3,593,243 A * 7/1971 Trump .................. H01F 27/324
336/184
5,440,075 A * 8/1995 Kawakita ............. H05K 3/4046
174/261
5,912,622 A * 6/1999 Endo ........................ B62H 5/20
29/846

(Continued)

FOREIGN PATENT DOCUMENTS

CN      109087798 A  * 12/2018  ............. H01F 27/28
EP       2613329 A1     7/2013

(Continued)

OTHER PUBLICATIONS

International Search Report and Written Opinion for corresponding International Application No. PCT/US2018/027484, dated Jul. 27, 2018.

*Primary Examiner* — Elvin G Enad
*Assistant Examiner* — Joselito S. Baisa
(74) *Attorney, Agent, or Firm* — Marshall, Gerstein & Borun LLP

(57) ABSTRACT

A laminate includes multiple paper layers, with at least one induction coil comprising first and second sets of windings. Two or more paper layers include the sets of windings comprising an electrically-conductive material. The sets of windings may be distributed throughout the laminate layers and provide good wireless induction charging performance in a compact space.

20 Claims, 13 Drawing Sheets

(56) References Cited

U.S. PATENT DOCUMENTS

| | | | |
|---|---|---|---|
| 6,086,441 A * | 7/2000 | Akiguchi | H01J 9/28 |
| | | | 349/152 |
| 6,180,215 B1 | 1/2001 | Sprietsma et al. | |
| 6,468,677 B1 | 10/2002 | Benton et al. | |
| 6,774,316 B1 * | 8/2004 | Suzuki | H05K 3/4069 |
| | | | 174/262 |
| 7,164,255 B2 * | 1/2007 | Hui | H01F 17/0006 |
| | | | 320/108 |
| 7,911,311 B2 * | 3/2011 | Matsuta | H01F 17/0013 |
| | | | 336/192 |
| 10,118,547 B2 | 11/2018 | Duce et al. | |
| 2002/0023777 A1 | 2/2002 | Ochi et al. | |
| 2004/0067348 A1 * | 4/2004 | Nishii | H05K 1/0366 |
| | | | 428/209 |
| 2004/0091694 A1 * | 5/2004 | Holzer | B29C 35/0272 |
| | | | 428/323 |
| 2004/0224135 A1 | 11/2004 | Krebs | |
| 2006/0127673 A1 | 6/2006 | Aho et al. | |
| 2007/0006452 A1 | 1/2007 | Egitto et al. | |
| 2007/0102804 A1 | 5/2007 | Nakamura et al. | |
| 2008/0145607 A1 * | 6/2008 | Kajiwara | H01L 21/563 |
| | | | 428/137 |
| 2010/0112285 A1 * | 5/2010 | Decoene | B32B 38/06 |
| | | | 428/141 |
| 2011/0101366 A1 | 5/2011 | Dozen et al. | |
| 2014/0210279 A1 | 7/2014 | Van Herpen et al. | |
| 2015/0048687 A1 | 2/2015 | Wang | |
| 2015/0145634 A1 * | 5/2015 | Kurz | H01F 38/14 |
| | | | 336/232 |
| 2015/0296612 A1 | 10/2015 | Gumbiowski et al. | |
| 2015/0364244 A1 * | 12/2015 | Tsai | H01F 27/2871 |
| | | | 336/200 |
| 2016/0104560 A1 * | 4/2016 | Ohkoshi | C01G 49/06 |
| | | | 252/62.59 |
| 2016/0104566 A1 | 4/2016 | O'Brien et al. | |

FOREIGN PATENT DOCUMENTS

| | | |
|---|---|---|
| WO | WO-99/38686 A1 | 8/1999 |
| WO | WO-2015/060781 A1 | 4/2015 |
| WO | WO-2017/111590 A1 | 6/2017 |
| WO | WO-2017/138812 A1 | 8/2017 |
| WO | WO-2017/142412 A1 | 8/2017 |

* cited by examiner

LAMINATE WITH INDUCTION COILS

BACKGROUND

Wireless inductive device charging is a technology that uses the near field wireless transmission of energy between two coils tuned to resonate at the same frequency. With one coil located in an inductive charging base station, another coil located in an electronic device may receive a transmission of energy to charge its battery wirelessly. Wireless charging is highly desirable because consumers can readily charge devices when and where needed. In addition, wireless charging obviates the need for different chargers for different devices.

Inductive charging base stations typically require a precise alignment between the two coils to perform an energy transfer of sufficient power to charge the electronic device. Even an electronic device that is slightly misaligned with an inductive charging base station or a device that has shifted position slightly, such as by a vibration user alert, may fail to charge. Inductive charging base stations are limited in the number of coils that could be added to improve performance, due to heat dissipation, available space, and other design considerations.

Laminates are useful as surfacing materials, including as decorative surfaces, in many situations due to their combination of desirable qualities (e.g., superior wear, heat and stain resistance, cleanability, and cost). Laminates are composed of discrete layers, such as layers of resin-impregnated kraft paper that are pressed to form the laminate. One conventional decorative laminate is made by stacking three sheets of treated kraft paper (e.g., three sheets of phenol-formaldehyde resin-impregnated kraft paper), a print sheet (e.g., dry decorative paper), and a sheet of treated overlay paper (e.g., melamine-formaldehyde resin-impregnated tissue paper or acrylic resin-impregnated tissue paper), one on top of another and then bonded together with heat and pressure.

A high-pressure laminate process (HPL) is an irreversible thermal process wherein resin-impregnated sheets of kraft paper undergo a simultaneous pressing and heating process at relatively high levels of heat and pressure, such as temperatures greater than or equal to 125° C. and at least 5 mega Pascals (MPa) of pressure, typically for a press cycle of 30-50 minutes. An HPL process contrasts with low pressure laminate processes (LPL) that is conducted at pressures of less than 5.0 MPa, typically between 2-3 MPa.

SUMMARY OF THE DISCLOSURE

This summary is provided to introduce a selection of features in a simplified form that are further described in the Detailed Descriptions. This summary is not intended to identify key features or essential features of the claimed subject matter, nor is it intended to be used to limit the scope of the claimed subject matter.

In an embodiment, the disclosure provides a laminate for accomplishing wireless power transfer, comprising at least first and second paper layers, the second paper layer being disposed above the first paper layer in the laminate; an insulating layer disposed above the second paper layer; at least one induction coil comprising an electrically-conductive material, the induction coil further comprising a first set of windings arranged on the first paper layer and a second set of windings arranged on the second paper layer, the first set of windings and the second set of windings being electrically connected in series; wherein the first paper layer, the second paper layer, and the insulating layer encapsulate the induction coil within the laminate.

In another embodiment, the disclosure provides a laminated surfacing material for inductively charging electronic devices comprising at least first and second paper layers, the second paper layer being disposed above the first paper layer; an induction coil comprising an electrically-conductive material, the induction coil further comprising a first set of windings arranged on the first paper layer and a second set of windings arranged on the second paper layer, the first set of windings and the second set of windings being electrically connected in series and including at least two electrical contact pads exposed to the outside of the laminated surfacing material; and the laminated surface material including a decorative layer disposed above the first paper layer and the second paper layer, the decorative layer not including an induction coil or any winding thereof.

In a further embodiment, the disclosure provides a method of making a laminated surface material, the method comprising: providing at least a first paper layer and a second paper layer; forming an induction coil comprising an electrically-conductive material, the induction coil further comprising a first set of windings arranged on the first paper layer and a second set of windings arranged on the second paper layer; compressing the first paper layer and the second paper layer according to a lamination process, thereby connecting the first set of windings to the second set of windings in series through a via, the via extending from the first paper layer to the second paper layer.

DETAILED DESCRIPTION

Figure 1:
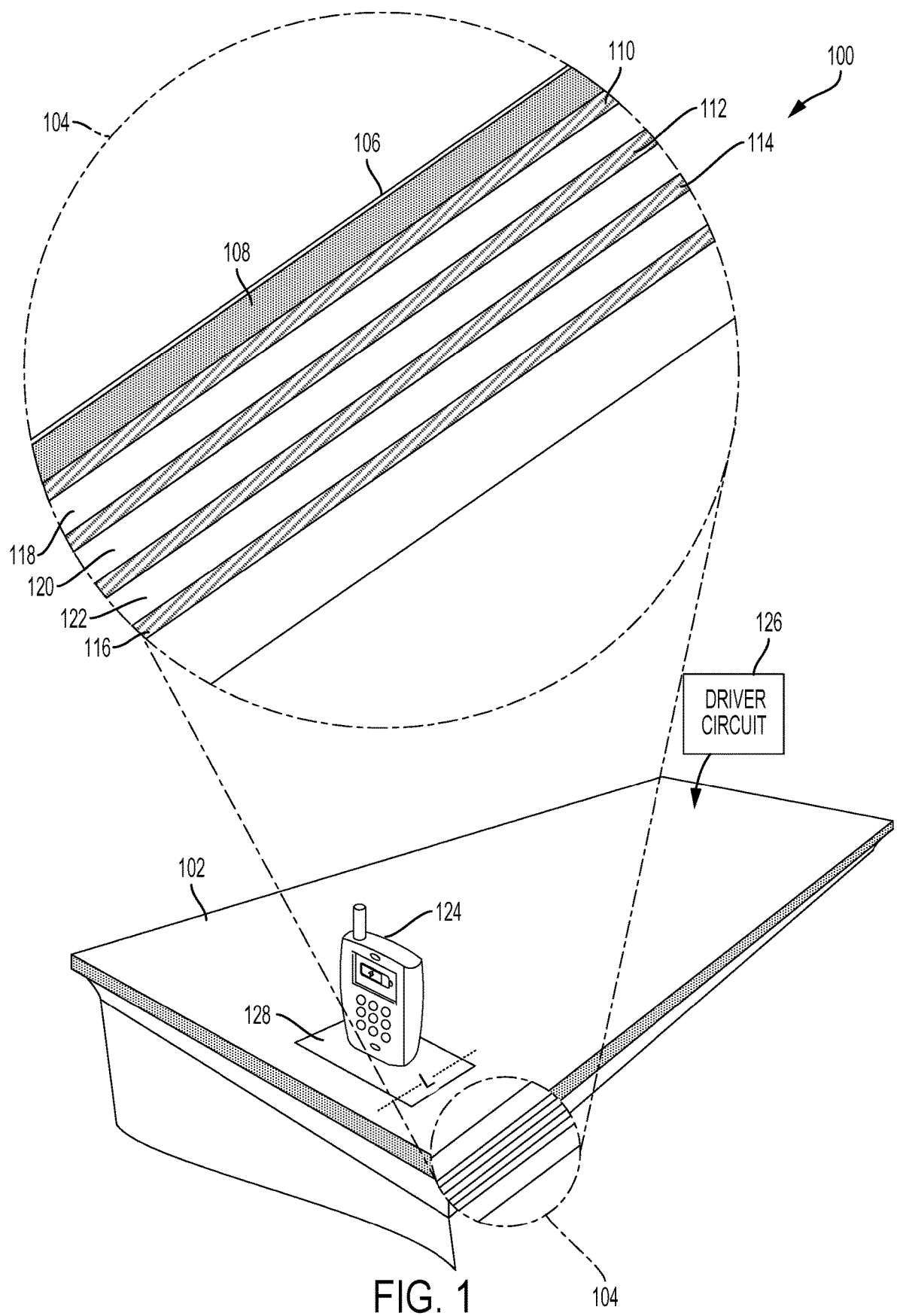
FIG. 1 is a schematic diagram of an example of a wireless charging system including a laminate surfacing material integrated into a countertop with sets of windings of induction coils on multiple layers for charging an electronic device.

A laminate for accomplishing wireless power transfer comprising at least first and second paper layers, the second paper layer being disposed above the first paper layer in the laminate, an insulating layer disposed above the second paper layer, an inductive coil comprising an electrically-conductive material, the inductive coil further comprising a first set of windings arranged on the first paper layer and a second set of windings arranged on the second paper layer, the first set of windings and the second set of windings being electrically connected in series is disclosed. In embodiments, the first paper layer, the second paper layer, and the insulating layer may encapsulate the inductive coil within the laminate. In embodiments, the insulating layer may comprise a decorative layer. For example, the insulating layer may comprise a resin-impregnated decorative layer. As another example, the insulating layer may comprise a treated overlay paper layer. When the insulating layer comprises a treated overlay paper layer, the laminate may further comprise a dry or untreated decorative paper (also known as a print sheet) between the treated overlay paper layer and the second paper layer. Of course, the laminate may also comprise glue films, for example, when untreated kraft paper layers are included as further described below.

Generally, as used herein, a "decorative layer" is a visible outer layer in the (final, assembled) laminate. A decorative layer may have decorative colors and/or designs. Of course, as mentioned above, an overlay layer may be disposed above a decorative layer provided that the decorative layer is at least partially visible through the overlay layer.

A laminate surfacing material with at least one inductive coil comprising a first set of windings and a second set of windings which are arranged on different paper layers of the laminate surfacing material has particularly useful characteristics for performing wireless charging including: the ability to add more inductive coils in a space-efficient manner by providing additional coils/windings on different layers of the laminate; favorable heat-dissipation properties due to the lack of insulating air inside the laminate and optional use of fillers with high heat transfer coefficients (e.g., ceramics such as aluminum nitride, aluminum oxide, boron nitride, and combinations thereof) in the resin formulations used to prepare the resin-impregnated paper layers such that heat transfer away from the coils is enhanced, effectively turning the laminate surfacing material into an efficient heat sink and facilitating the utilization of multiple coils; unexpected and surprising electrical conductivity of the electrically-conductive material used to provide the coils/windings even after undergoing an HPL process; and the ability to be integrated into almost any surface (e.g., countertop, wall, piece of furniture, door, window frame, interior of a vehicle, etc.). The resin-impregnated paper layers also provide a durable enclosure for the induction coils or sets of windings. The laminate comprising the sets of windings may advantageously be incorporated into a surface or into a wireless inductive charging station to provide surprisingly efficient wireless charging to electronic devices having an appropriate receiver coil.

The induction coils may be formed by providing (e.g., depositing) an electrically-conductive material (e.g., an electrically-conductive ink) on paper layers (e.g., kraft paper, overlay paper, etc.) having vias cut through the paper for electrically coupling sub-coils or layers of the induction coils. Disposing (e.g., printing) the electrically-conductive material onto paper allows the paper fibers to act as reinforcements for various layers of the coils created from the electrically-conductive material, preventing breakage of the induction coils due to shrinkage or expansion due to various environmental conditions. The layers of the induction coils may be stacked and encapsulated between discrete paper layers using a lamination process. While low pressure lamination may be used to prepare laminates according to the disclosure, a high pressure lamination process including a re-cooling stage (referred to herein as "high pressure lamination process") is preferred.

As described herein, the induction coils or windings are "encapsulated" or substantially protected by providing the electrically-conductive material for the windings/coils on a paper layer and disposing another paper layer or an insulating layer above the electrically-conductive material such that the windings or coils are at least partially protected or shielded from ambient atmosphere by the overlying layer.

It has been found that when laminates are exposed to the heat and pressure in the high pressure lamination process, the risk of breaking or delamination of the sub-elements or layers of the induction coils is greatly reduced. The high pressure lamination process allows the windings and/or induction coils to have electrically-conductive tracks having improved track densification, which achieves surprisingly higher conductivities than through other conventional manufacturing techniques. Initiating the high pressure lamination process after stacking the layers of the induction coils between the paper layers collectively cures all layers included in the laminate simultaneously, which eliminates the conventional need for using an adhesive to adhere together layers that have individually been fully cured. The high pressure, re-cooling press allows for accurate control of temperature and pressure (e.g., heating and cooling cycles) in order to control the rate of dimensional change of all layers and surprisingly leads to enhanced electrical conductivity of the electrically-conductive material used in the laminate process.

Various embodiments of the present disclosure are methods for preparing high pressure laminates with induction coils embedded within the laminate. The methods include forming vias through paper layers, printing (e.g., inkjet printing, flexographic printing, gravure printing, screen printing, extrusion printing, and the like) windings or sub-elements or layers of the induction coils with electrically-conductive material onto the paper layers, and providing vias through the paper layers at selected locations with an electrically-conductive material to electrically couple various layers having windings (or sub-elements) of the induction coils. Factors in determining the selected locations may include efficient layout design, avoiding shorting layers of the induction coils, coil geometry needed for inductive coupling, etc. The layers of the induction coils may be stacked and encapsulated between the paper layers by subjecting the laminate to the high pressure lamination process, which surprisingly results in advantageously enhanced densification of the electrically-conductive material and excellent conductivity. It should be noted that the same electrically-conductive material may be used for the windings of the induction coils and the vias, but different electrically-conductive materials may also be used.

In one preferred embodiment, a method of making a laminated surface material comprises providing at least an first untreated kraft paper layer, a glue film layer, and a second untreated kraft paper layer; forming an induction coil comprising an electrically-conductive material, the induction coil further comprising a first set of windings arranged on the first untreated kraft paper layer and a second set of windings arranged on the second untreated kraft paper layer; arranging a stack comprising at least the first untreated kraft paper layer, the glue film layer, and the second untreated kraft paper layer such that the second untreated kraft paper layer is disposed above the glue film layer, and the treated overlay paper layer is disposed over the first untreated kraft paper layer; compressing the stack according to a lamination process and thereby connecting the first set of windings to the second set of windings through a via, the via extending from the first set of windings to the second set of windings. In this embodiment, the sets of windings are disposed (e.g., printed) on the first untreated kraft paper layer and the second kraft paper layer and a glue film layer is included there between. Typically, the stack includes an additional glue film layer above the second untreated kraft paper layer and an additional glue film layer disposed below the first untreated kraft paper layer so as to allow a sufficient amount of resin to saturate the laminate during a lamination process, in order to provide sufficient mechanical strength to the final formed laminate. By providing the sets of coils on untreated kraft paper, significantly improved alignment of holes formed in the stack can be achieved than when the sets of coils are disposed on resin-impregnated paper layers. A glue film layer as used herein is a layer having a sufficient amount of thermoset resin to saturate an adjacent untreated paper layer (e.g., a decorative layer or a kraft paper layer). Typically, a glue film layer will comprise a paper layer having between 30-80 percent by weight of a thermoset resin. Preferably, the thermoset resin of the glue film comprises phenol-formaldehyde resin.

Thus, a preferred laminated surface material comprises a stack comprising at least an first untreated kraft paper layer, a glue film layer, and a second untreated kraft paper layer such that the second untreated kraft paper layer is disposed above the glue film layer, and the glue film layer is disposed over the first untreated kraft paper layer; an induction coil comprising an electrically-conductive material, the induction coil further comprising a first set of windings arranged on the first untreated kraft paper layer and a second set of windings arranged on the second untreated kraft paper layer, the first set of windings and the second set of windings being connected in series through a via, the via extending from a terminus of the first set of windings to a terminus of the second set of windings. In this embodiment, the sets of windings are disposed (e.g., printed) on the first untreated kraft paper layer and the second kraft paper layer and a glue film layer is included there between. Typically, the stack includes an additional glue film layer above the second untreated kraft paper layer and an additional glue film layer disposed below the first untreated kraft paper layer so as to allow a sufficient amount of resin to saturate the laminate during a lamination process, in order to provide sufficient mechanical strength to the final formed laminate.

Conductive materials suitable for use in accordance with the various embodiments of the present disclosure include any material which can be deposited upon paper, such as resin-impregnated paper, and which is electrically conductive. In some embodiments, the composition of the electrically-conductive material includes: (i) a particulate, electrically-conductive material; (ii) a binder; and (iii) a microcrystalline cellulose component.

The particulate, electrically-conductive material may include any one of metals, metal alloys, electrically-conductive carbons (e.g., electrically-conductive allotropes of carbon, graphites), electrically-conductive polymers (e.g., polypyrrole), electrically-conductive metallized polymers (e.g., metallized polyethylene terephthalates), and combinations thereof. In a preferred aspect, the particulate electrically-conductive material comprises silver and/or silver alloys. electrically-conductive ink compositions which may be deposited to provide electrically-conductive material on a paper layer and are thus suitable for use in various embodiments of the disclosure typically include particles comprising metal, metal alloys, electrically-conductive carbon, or other electrically-conductive materials such as polymers, in a carrier medium which may include other polymers, solvents and additives. Various known methodologies such as inkjet printing, screen printing, flexographic printing, gravure printing, or extrusion printing may be used to deposit the electrically-conductive ink compositions on the substrate.

One embodiment of an electrically-conductive ink composition suitable for providing the particulate electrically-conductive material is an electrically-conductive ink composition comprising: (i) a particulate, electrically-conductive material; (ii) a carrier liquid; (iii) a polymer binder; and (iv) a microcrystalline cellulose component. Another embodiment of an electrically-conductive ink composition suitable for providing the particulate electrically-conductive material is an electrically-conductive ink composition comprising: (i) a particulate, electrically-conductive material; (ii) a carrier liquid; (iii) a polymer binder; and (iv) a microcrystalline cellulose component; wherein the particulate, electrically-conductive material comprises a component selected from the group consisting of silver and silver alloys; and wherein the microcrystalline cellulose component is present in an amount of from about 0.05% to about 10% by weight based on the composition and has an average particle size of from about 20 to about 100 μm. In certain embodiments of the disclosure, the microcrystalline cellulose component may include two or more microcrystalline celluloses having different average particle sizes. As noted above, printing methods such as inkjet printing, flexographic printing, gravure printing, screen printing, and extrusion printing may dispose the electrically-conductive material onto the paper layers, such as kraft paper and overlay paper, but depending on the type of paper, the electrically-conductive material may or may not penetrate completely through the paper.

If kraft paper (i.e., unbleached paper that is typically between 50-400 GSM (or $g/m^2$)) is used, and an electrically-conductive ink composition is deposited thereon, the electrically-conductive material may penetrate about halfway through the kraft paper, whereas if overlay paper (i.e., bleached paper that is typically between 10-50 GSM) having less than half the basis weight of kraft paper is used, and an electrically-conductive ink composition is deposited thereon, the electrically-conductive material will typically penetrate completely through the overlay paper. As such, in order to couple electrically-conductive material provided on different layers of kraft paper together, apertures can be cut at least halfway through the kraft paper, so that electrically-conductive material disposed over a top surface of the first kraft paper can penetrate halfway through the first kraft paper to form a via and establish an electrical connection with a same type or different type electrically-conductive material provided on a top surface of a second kraft paper layer underlying the first kraft paper layer. Because deposited electrically-conductive material may penetrate completely through overlay paper, it is not necessary to cut apertures in the overlay paper to form a via and couple the electrically-conductive material disposed on a top surface of a first overlay paper layer to a same type or different type electrically-conductive material disposed on a top surface of a second paper layer disposed thereunder. Once printed, the electrically-conductive material may be subject to the high pressure lamination process involving pressing at elevated temperature and pressure prior.

The electrically-conductive materials described above may be disposed as a set of windings about a given point in a pattern over the paper layers in various embodiments of the present disclosure. Suitable winding patterns include, but are not limited to: continuous, meandering lines, spirals, spirangles, circles, ovals, polyhedral shapes such as rectangles, squares, hexagons, octagons, sawtooth waves, and combinations thereof. Preferably, electrically-conductive materials are disposed in patterns which provide a relatively large amount of electrically-conductive material on the paper layer while maintaining a gap between adjacent portions of the electrically-conductive pathway, i.e., not providing the windings such that there is overlap between individual traces of the windings. The cross-sectional area of any linear portion of an electrically-conductive material is important in circumstances where electrical resistance is to be minimized as the total electrical resistance of any electrically-conductive track is the product of the specific resistance per square (related to cross-sectional area) and the track length. In other words, as understood by those skilled in the art, greater cross-sectional areas lead to lower overall track resistances which lead to lower resistive heating for similar electric current levels.

It may be preferable to optimize the relationship between track vertical thickness, the cross sectional area and the pitch (i.e., the distance between two adjacent linear portions or tracks of the electrically-conductive material disposed on a paper layer) which should be controlled to be as small as possible while ensuring that the two adjacent linear portions do not touch. It is also important to note that the pressure involved in the compression steps of the high pressure lamination process reduces the vertical thickness of the electrically-conductive track. The overall effect on total electrical resistance may vary as the compression may increase specific resistance of the electrically-conductive material by decreasing the cross-sectional area, while also increasing electrically-conductive contact between electrically-conductive particles within the electrically-conductive materials, thus decreasing resistance. Thus, various factors affect overall resistance. Preferably all such factors are considered in efforts to reduce overall resistance, and thus, heat generation.

The laminate in accordance with the various embodiments of the present disclosure may include one or more electrical contact pads which allow an electrical connection to be established to a via from the exterior of the laminate. In various embodiments wherein the laminate includes first and second sets of windings comprising the electrically-conductive materials and the first and second sets of windings are connected in series, as described herein, the laminate may include an electrical contact pad coupled to a via providing a site for making electrical connection to a first terminus of the first set of windings in the series, and a second electrical contact pad coupled to a second via providing a site for making an electrical connection to the second terminus of the second set of windings in the series. In the various embodiments of the present disclosure, the laminate may further be coupled to a component or components connected to the electrical contact pads on the exterior of the laminate which component(s) are configured to accept AC, or pulsed DC, voltage input from an external source such that the electrically-conductive material(s) are provided with a current. Such components may include, but are not limited to various male and female receptacles for AC and DC plugs, and terminal boxes or the like for hard-wiring AC or DC inputs. Electrical contact with the vias may also be established by coupling any electrically-conductive material to the electrical contact pads using various structures including but not limited to metal tabs, screws, prongs, cylindrical receptacles, spring-loaded pins, etc.

A laminate's paper layers may be impregnated with resin such that the paper layers, when stacked and compressed in the lamination process, can be cured or cross-linked. The resin can be a thermoset resin such that the paper layers in a stacked relationship can be compressed and heated to cure the thermoset resin. Specific suitable resins for use in the various embodiments of the present disclosure may differ depending on whether the resin-impregnated paper layer is an outer protective layer (e.g., an insulating layer), or an interior core layer (e.g., a treated kraft paper layer), or a base layer of the laminate surfacing material (e.g., a treated kraft paper layer). Generally, resin-impregnated paper layers are impregnated with any suitable thermoset resin including, but not limited to, acrylics, polyesters, polyurethanes, phenolics, phenol-formaldehydes, urea-formaldehydes, aminoplastics, melamines, melamine formaldehydes, diallyl-phthalates, epoxides, polyimides, cyanates, and polycyanurates, or copolymers, terpolymers, or any combinations of the foregoing. Phenol-formaldehyde are generally preferred for impregnating kraft paper and acrylics or melamine-formaldehydes are generally preferred for impregnating overlay paper. As used in this disclosure, a translucent layer means any layer that permits at least some light to pass therethrough. In other words, layers that are partially opaque are included as translucent layers.

In some implementations, resin-impregnated paper layers which are core layers are impregnated with a phenolic and/or epoxy resin, such as, for example, a phenol-formaldehyde resin. Impregnating paper layers with a resin can be carried out in any suitable manner sufficient to apply a controlled quantity of resin to the paper, including but not limited to, screen printing, rotary screen printing, dip and squeeze, dip and scrape, reverse roll-coating, Meyer bar, curtain coating, slot-dye and gravure roller. The weight percentage of resin applied, relative to the weight of the paper layer as measured on an oven dried basis, is in the range of about 5 to 75%, with a preferred resin content percent (determined relative to final weight) of about 15-45%. As the resins used in the impregnating step are normally aqueous or solvent based solutions, it is common in the laminating process to include a paper drying stage to reduce the paper solvent loading. In the various embodiments of the present disclosure, the weight percent level of residual solvent in the impregnated paper is 2.5-15% with a typical level of about 5%. As used herein, cured can refer to both curing of a thermoset resin in the sense of its irreversible setting, or the crosslinking of other polymers with a separate cross-linker or by various forms of energy, or any means of fixing the resin when the laminate surfacing material is in its compressed form such that the electrically-conductive materials are encapsulated and will remain so during normal operation.

Suitable papers which may be used in resin-impregnated paper layers in accordance with the various embodiments of the present disclosure include but are not limited to: cellulose fiber, synthetic woven or non-woven fiber, or/and microfiber or/and nanofiber, mixtures of cellulose or/and synthetic fiber based papers or/and mineral fiber based papers or/and glass fiber based papers, coated or non-coated, pre-impregnated or non pre-impregnated that could be generally used for the production of laminates. In various embodiments of the present disclosure, paper suitable for use in resin-impregnated paper layers has at least one, and preferably all of the following properties: a minimum wet strength in the machine direction of 1400 cN/30 mm in accordance with the test method of the International Standard DIN ISO 3781, a Klemm absorbency range (capillary rise) in the machine direction of 30 to 90 mm/10 min in accordance with the test method of the International Standard DIN ISO 8787 with a preferred absorbency of 45 mm/10 min, Ash content of 0 to 50% depending of the intrinsic nature of the paper used in accordance with the test method of the International Standard Din ISO 2144, a basis weight range of 10 to 400 GSM at moisture content range of 2 to 8% in accordance the test method of the International Standard DIN ISO 536, a pH (on hot extract) between about 4 and about 9 in accordance with the test method of the International Standard DIN ISO 6588. In various embodiments of the present invention, papers comprising at least a portion of recycled materials may be used.

In various preferred embodiments of methods of making surfacing materials in accordance with the present disclosure, the high pressure lamination process is employed. In accordance with such various preferred embodiments, the multiple layers, including both paper layers and sets of windings on layers or layers of the induction coils according to any of the previously described embodiments are positioned in a stacked relationship between two pressing plates. In such a high pressure lamination process, the plates are then pressed to a specific pressure of at least 5 MPa. The temperature is then raised in excess of 125° C., typically to about 140° C. The plates are then held at the elevated pressure and temperature for a period of time suitable for curing the resin. The temperature is then lowered to 40° C., while maintaining the elevated pressure. The typical cycle time under pressure is between about 25 and about 50 minutes. Upon achieving a temperature of 40° C., the pressure on the plates is then reduced to zero gauge pressure. While it is important to take care in ensuring that the stacked layers are aligned where an electrically-conductive connection between adjacent electrically-conductive materials through an aperture in an intervening layer is to be established, the layers need not otherwise be placed in perfect edge to edge alignment, as a post-pressing trimming may be carried out to shape the final surfacing material.

While resin-impregnated layers are typically used to prepare the laminates comprising an inductive coil having first and second sets of windings for each induction coil disposed on discrete layers of the laminate according to the disclosure, alternatively, paper layers having pressure-sensitive adhesives thereon can be compressed with the pressure-sensitive adhesives in a facing relationship to form a comparable laminate structure. In such a process, a mask can be applied at any locations where vias are desired in the final laminate product to facilitate via formation, similar to the procedure described herein with reference to FIG. 3.

In an implementation, induction coils printed in electrically-conductive ink are connected to a driver circuit to drive current through the induction coils and provide near field wireless transmission of energy from the coils in the laminate, with the induction coils being tuned to the same frequency as receiver coils in an electronic device. To electrically connect the respective induction coils to each other (e.g., in series), and to the driver circuit, the laminate includes vias between different layers in the laminate. The induction coils therefore form a circuit that can be driven by the driver circuit to wirelessly charge electronic devices.

Other examples of components that may be included in the core of the laminate include components needed to provide wireless charging to electronic devices. In an implementation, an oscillator is configured to produce a chosen resonant frequency because resonant inductive coupling will not occur unless the sending coil and the receiving coil are tuned to the same frequency. A power transistor serves as an amplifier for driving the induction coils in the installed laminate. A full wave rectifier is configured to convert incoming AC power from a power source to a DC value for use in driving the induction coils in the installed laminate. A voltage regulator s configured to create a usable voltage for charging depleted batteries in an electronic device. A control circuit is configured to manage the charging process for lithium-ion (Li-Ion) or NiMH battery chemistries, etc.) in electronic devices. Each of these components can be coupled to the induction coils in the laminate surfacing material and disposed between discrete layers of the laminate surfacing material.

FIG. 1 is a schematic diagram of an example of a wireless charging system 100 including a laminate surfacing material integrated into a countertop 102 with sets of windings of induction coils on multiple layers for charging an electronic device 124. The countertop 102 is covered with the induction coil laminate surface. Other types of surfaces may also be covered with the induction coil laminate surface (e.g., wall, piece of furniture, door, interior of a vehicle, etc.). The laminate includes sets of windings deposited as electrically-conductive tracks on two or more layers of the laminate surfacing material. In an implementation, induction coils are not deposited throughout the entire area covered by the laminate surfacing material (e.g., the entire countertop 102), but rather are located in only a portion of the laminate surfacing material, such as in a designated wireless electronic device charging area 128. The wireless electronic device charging area 128 may be denoted by markings on the surface of the countertop 102 to inform users where inductive coupling is likely to be strong enough to wirelessly charge an electronic device efficiently.

Bubble 104 illustrates a cross-section view of an example laminate including a plurality of planes of windings printed on different layers of the laminate. In an implementation, electrically-conductive ink is deposited in the shape of windings of induction coils on paper layers of the substrate. Throughout this disclosure, references to electrically-conductive ink should be understood to include the electrically-conductive ink itself in addition to electrically-conductive particles left behind after the electrically-conductive ink has dried.

Several induction coils are generally illustrated in bubble 104. In the cross-section view of bubble 104, coil segments 110, 112, 114, and 116 are visible along the cross-section. In such a cross-section view, windings of induction coils embedded in layers of the laminate surfacing material may extend linearly along the line L or may be in a direction perpendicular to the line L, in which case the coils may appear shorter in the cross-section view because only the width of the electrically-conductive track, and not the length, is visible. In an implementation, other layers 118, 120, and 122 are disposed in between laminate layers that have windings of induction coils disposed thereon. In an implementation, layers 118, 120, and 122 are insulating layers. Also in bubble 104 are two layers 106 and 108 disposed above the layers 110, 112, 114, and 116 that have windings comprising the electrically-conductive material therein. Layer 106 and 108 may each comprise a decorative layer, an insulating layer, a transparent layer, a translucent layer, and/or a surface layer. In a preferred embodiment, the structure of the laminate surfacing material advantageously allows the uppermost set of windings in the laminate to be separated from the top surface of the laminate by only layers 106 and/or 108 such that a top surface of the uppermost coil is separated from the device to be charged by no more than a distance of 0.6 mm, more preferably no more than 0.4 mm, thereby facilitating the efficient transfer of energy from the sets of windings and/or induction coils to the device being charged and avoiding radiative losses of energy.

Electronic device 124 includes a receiving induction coil to couple with the sets of windings 110, 112, 114, and 116 for the wireless transfer of energy. The electronic device 124 may include without limitation smartphones, wearables, tablets, laptops, fitness devices, e-readers, or any other type of electronic device that stores power in an on-board chargeable battery. If a user of the electronic device 124 places the electronic device 124 on the surface 102 close enough to charging region 128, then the surface 102 can provide a charge to the electronic device 124. Electronic device 124 may display a charging icon to alert a user of the electronic device 124 that the device is successfully charging on the surface 102. The minimum proximity of electronic device 124 to the induction coil needed for successful wireless charging may be increased by increasing the number of sets of windings and/or induction coils embedded in the surface 102.

In use, the surface 102 is equipped with a driver circuit 126 to manage the wireless charging of electronic device 124. A driver circuit 126 is electrically connected to the one or more induction coils (best shown as sets of windings 110, 112, 114, and 116 in bubble 104 of FIG. 1) in the laminate to perform operations needed to wirelessly charge an electronic device (e.g., an oscillator capable of producing a chosen resonant frequency, a power transistor to serve as an amplifier for driving the primary induction coil, a full wave rectifier to convert incoming AC power to a DC value, a voltage regulator to create a usable voltage for charging depleted batteries, a control circuit to manage the charging process for lithium-ion (Li-Ion) or NiMH battery chemistries, etc.). A wireless user interface for controlling the driver circuit 126 via an electronic device such as a smartphone or tablet, etc.) can be used.

Figure 2:
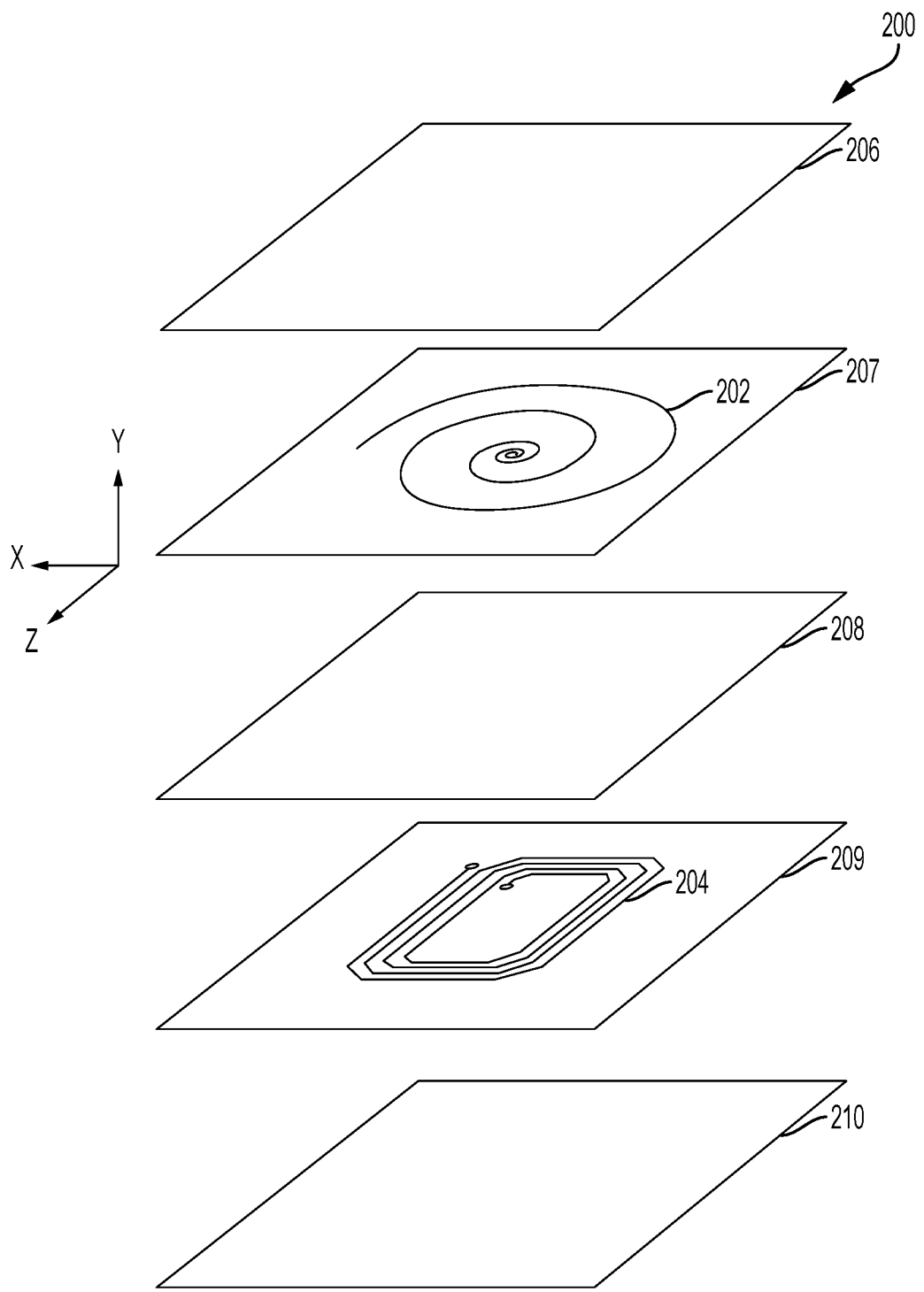
FIG. 2 is a schematic diagram of example sets of windings comprising electrically-conductive material on layers of kraft paper in a laminate.

FIG. 2 is a schematic diagram 200 of example sets of windings 202 and 204 comprising electrically-conductive material on layers of kraft paper 206-210 in a laminate. The sets of windings 202 and 204 can be deposited using an electrically-conductive ink composition as described above. The performance of a wireless induction charger depends on various factors relating to the example sets of windings 202 and 204 including without limitation varying diameters of the wire or electrically-conductive traces, different coil/winding geometries, and different coil/winding sizes. In an HPL laminate with windings of induction coils deposited on layers of the laminate, each set of windings will be in the plane of the layer in which it resides. Within that layer, the set of windings itself may have a variety of geometries. While two different exemplary winding patterns are illustrated in FIG. 2, it should be understood that an induction coil in a laminate according to the disclosure will generally include two sets of windings having the same winding pattern, as such matching patterns facilitates placement of vias to electrically couple the sets of windings to one another and to external circuitry.

In one implementation, a sheet of kraft paper 207 includes a set of windings 202 that were deposited using electrically-conductive ink onto the kraft paper 202 in the shape of a spiral. In another implementation, a sheet of kraft paper 209 includes a set of windings 204 that were deposited using electrically-conductive ink onto the kraft paper 209 in the shape of a "spirangle," in this case, an eight angle spirangle. As used in this disclosure, a spirangle is any shape that spirals inward toward a center point or spirals outward from a center point. A center point need not be located in the geometric center of a spirangle (or any other coil/winding geometry disclosed herein), but rather can be located near the geometric center at the end of the last inside winding of the coil. A spirangle may have any number of corners. In one implementation, a spirangle expands from a central point as it grows larger by adding straight lines. In another implementation, a spirangle may grow larger by adding lines that are partially curved, either along the entire edge of the spirangle or only curved at certain arcs along the edge of the spirangle.

In an implementation, each of the sets of windings for induction coils disclosed herein each include a first terminus and a second terminus. The first terminus may be located at or near the point at which the innermost winding of the spiral or spirangle begins and the second terminus may be located at or near the point at which the outermost winding of the coil ends. Generally, two sets of windings are electrically coupled or connected to one another in the laminate to form an induction coil and the first terminus and second terminus are electrically connected to the driver circuit that controls wireless charging of electronic devices. In one implementation, the two sets of windings disposed on separate paper layers of the laminate are electrically connected in series with the control circuit by electrically connecting a terminus of one set of windings and the terminus of the other sets of windings to the control circuit.

To electrically connect two sets of windings to form an induction coil with first and second sets of windings disposed on discrete layers, an electrical connection must be made that passes though one or more of the layers in the laminate and electrically connects the sets of windings. In an implementation, separate sets of windings for an induction coil are deposited on opposite sides the same layer, in which case a via need pass only through that layer to connect the induction coils. In other implementations, sets of windings are deposited on separate layers or are separated by one or more insulating layers. To connect sets of windings arranged in this way, a via must pass through more than one layer. Typically, a via electrically connects a first set of windings to a second set of windings by establishing electrical contact between a first terminus of the first set of windings and a second terminus of the second set of windings, where the first terminus and the second terminus share substantially the same vertical axis.

In at least one implementation, the first and second sets of windings for the induction coil 202 and 204 have eight windings. Eight windings are generally preferred to provide the induction coil(s) with the right inductance for effective wireless transfer of energy to a receiver coil in a electronic device to be charged. Generally, any inductance value, such as those set by the Wireless Power Consortium, in their Qi standard, can be achieved by modulating the number of windings, the coil shape, and the amount of electrically conductive material provided in the coils. Thus, the individual sets of windings of an induction coil are "split across" or disposed on different layers of the laminate. For example, a coil that includes eight windings may include four windings on a first layer of the laminate and another four windings on a different layer of the laminate, with each set of four windings being located directly above or below the other four windings to electrically form a single coil.

Figure 3:
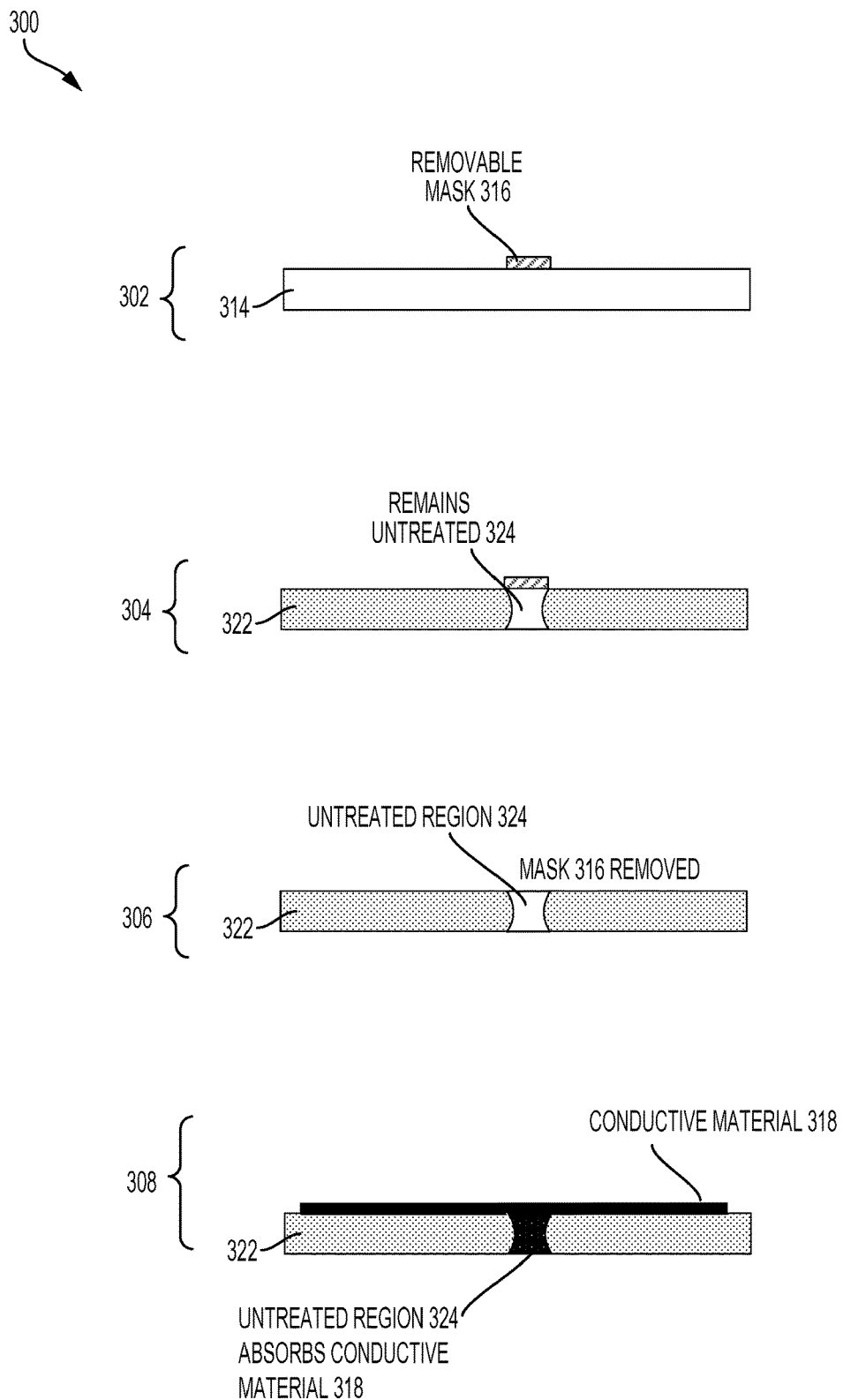
FIG. 3 generally illustrates example operations for forming an electrical via between layers in a laminate using a masking technique.

FIG. 3 illustrates example operations 300 for forming an electrical via between layers in a laminate using a masking technique. A layer for a laminate including sets of windings can be prepared with a sheet of untreated kraft paper 314 and partially covered with a removable mask 316 on of the surface of the untreated paper sheet 314 at a location of a desired electrical connection through the paper 314 at operation 302.

A resin-treating operation 304 impregnates the kraft paper 314 with a resin to form resin-treated paper 322. The mask 316 protects a portion 324 (also illustrated in operation 306) of the resin-treated kraft paper 322 during the resin-treating operation 304 and the portion 324 does not become impregnated with the resin. A removing operation 306 removes the mask 316, exposing the untreated region 324 of the resin-treated kraft paper 322 thereunder.

A depositing operation 308 deposits an electrically-conductive ink onto the resin-treated kraft paper 322, including onto the untreated region 324. Depositing operation 308 saturates the region 324 with electrically-conductive ink between the first electrically-conductive material 318 and a second electrically-conductive material, such as an electrically-conductive material disposed below the resin-treated kraft paper 322 thus bridging an electrical gap and establishing electrical contact between the twosides of the resin-treated kraft paper 322.

An HPL operation compresses and heats the treated kraft paper 322 together with other layers of a laminate. After completion of an HPL operation, the various layers of the laminate, such as treated paper layer 322, are compressed compared to before HPL operation 312, but the electrical connection between electrically-conductive material on either side of the kraft paper 322 has not been compromised. The windings of an induction coil that are on different layers in a laminate may thus be connected electrically after completion of an HPL operation.

Figure 4:
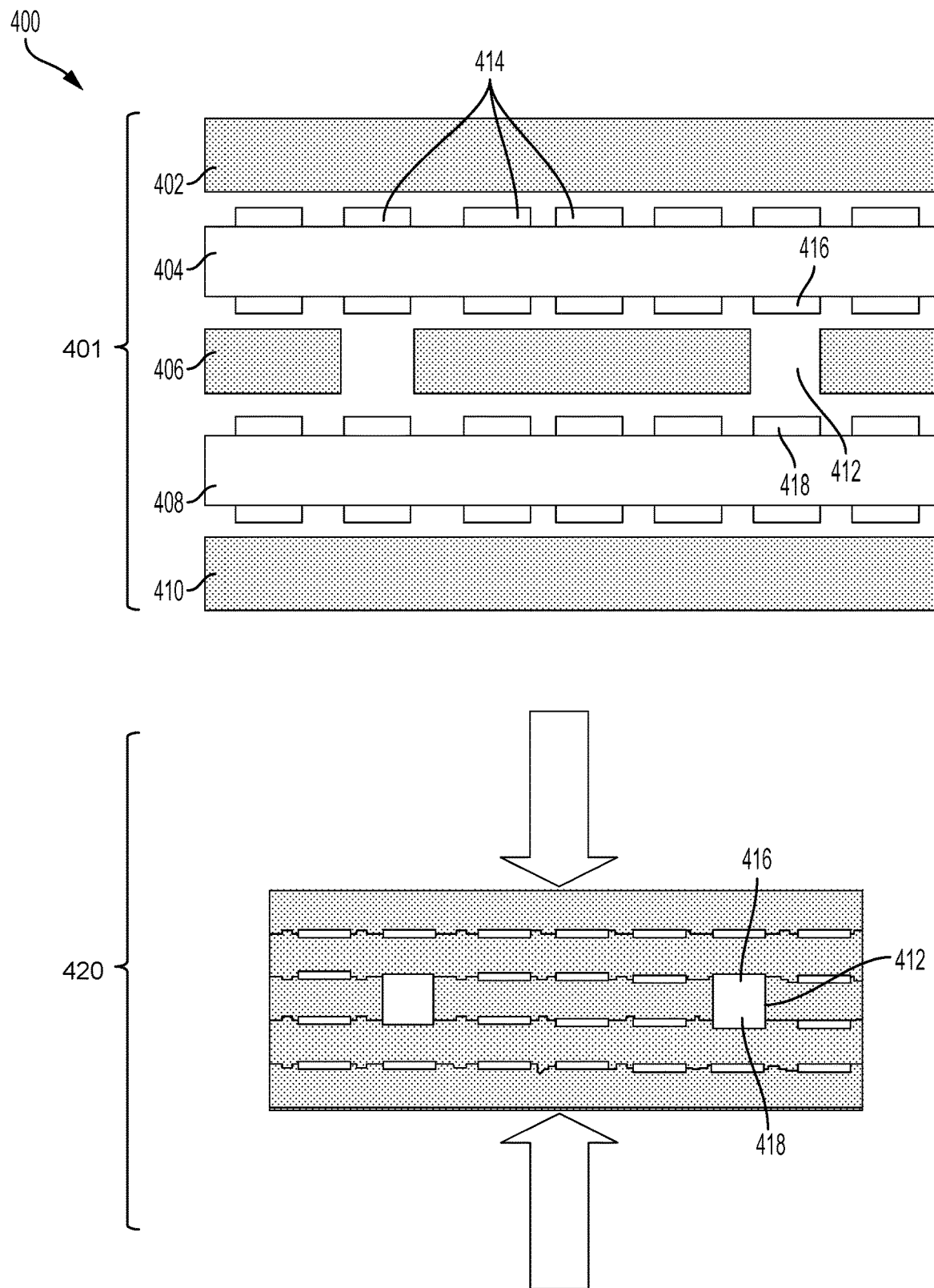
FIG. 4 generally illustrates example operations for forming an electrical via between layers in a laminate using a hole cutting technique.

FIG. 4 illustrates example operations 400 for forming an electrical via between layers in a laminate using a hole cutting technique. A hole forming operation 401 forms a hole 412 in a layer of resin-treated kraft paper 406. Resin-treated kraft paper 406 is part of a laminate that includes resin-treated kraft paper sheets 402, 404, 406, 408, and 410. Deposited on resin-treated kraft paper sheets 404 and 408 are electrically conductive materials 414, 416, 418. In an implementation, electrically conductive materials 414, 416, 418 have been deposited as one or more sets of windings in a spirangle shape pattern on resin-treated kraft paper sheets 404 and 408. Electrically conductive materials 416 and 418 are disposed on opposite sides of hole 412 in resin-treated paper layer 406.

An HPL operation 420 applies high heat and pressure to the stack of resin-treated papers. After the completion of HPL operation 420, the electrically conductive materials 416 and 418 that were arranged spaced apart and directly opposite to one another after hole forming operation 401 are now in electrical contract with one another. Windings on different layers in a laminate may thus be connected electrically after completion of an HPL operation 420.

Figure 5:
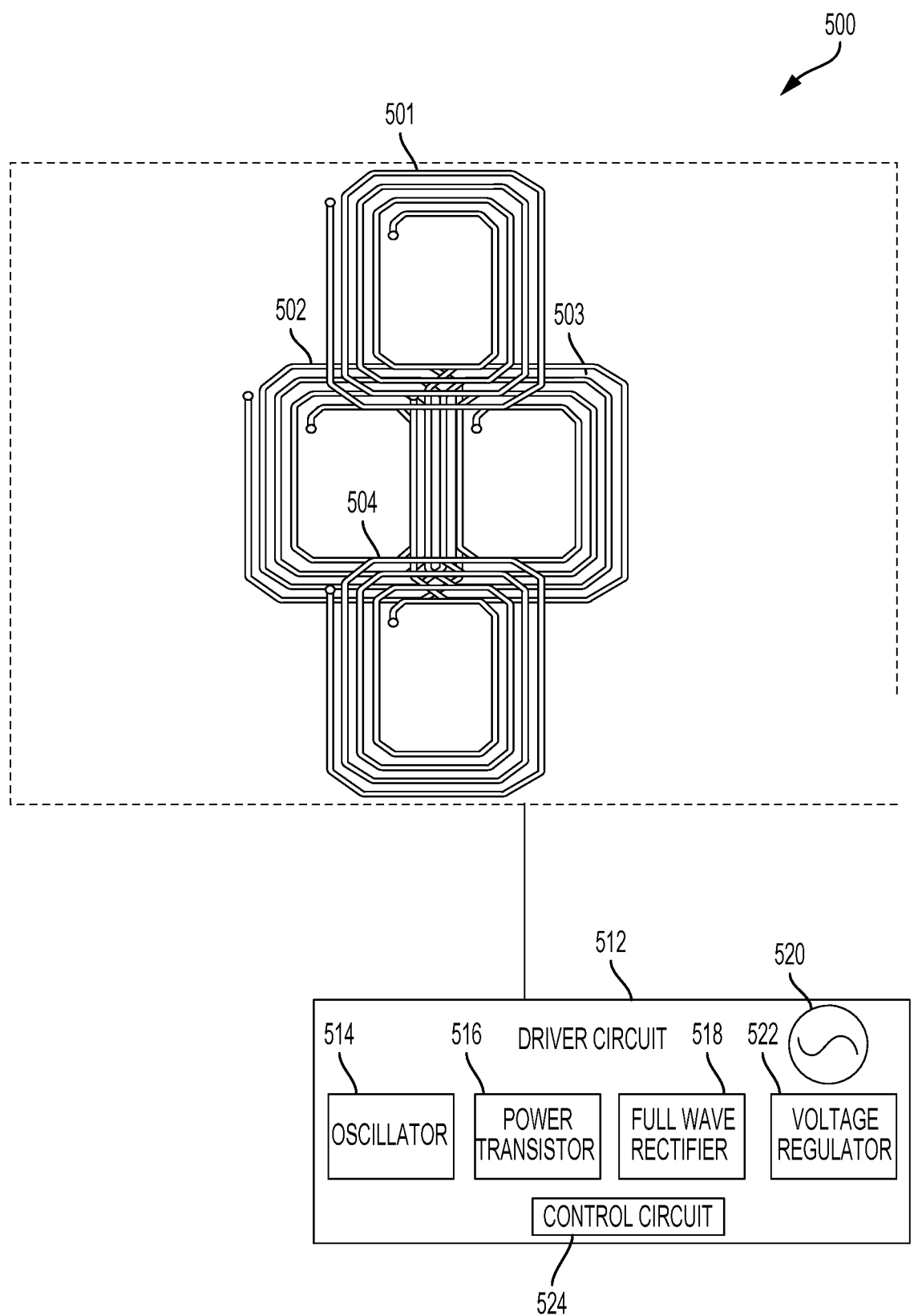
FIG. 5 is a top-down view of an example arrangement of four induction coils, each comprising an electrically-conductive material, the induction coils being disposed on multiple layers of the laminate with the windings of each coil being disposed on two discrete layers of the laminate.

FIG. 5 is a top-down view of an example arrangement 500 of four induction coils, 501-504, each comprising an electrically-conductive material, the induction coils being disposed on multiple layers of the laminate with the windings of each coil being split among two discrete layers of the laminate. In the example illustrated in FIG. 5, the induction coils 501-504 are arranged in a pattern such that the induction coils provide a contiguous wireless electronic device charging area that allows the user to advantageously charge their device without need for precise alignment of the electronic device coil with the underlying induction coils of the inductive charging base station. Each of the induction coils 501-504 is comprised of one or more sets of windings, each winding in a set of windings being part of a continuous electrical track forming the set of windings. Optional decorative or additional surface layers can be included for various reasons, such as improving the visual appeal, introducing different surface properties/characteristics, or to include additional conductive material to augment the coil structure in some manner.

The induction coils in the arrangement 500 are electrically connected to a driver circuit 512 configured to perform operations needed to wirelessly charge an electronic device. In an implementation, the driver circuit 512 includes multiple components. Oscillator 514 is configured to produce a chosen resonant frequency because resonant inductive coupling will not occur unless the sending coil and the receiving coil are tuned to the same frequency. Power transistor 516 serves as an amplifier for driving the induction coils 501-510. Full wave rectifier 518 is configured to convert incoming AC power from power source 520 to a DC value for use in driving the induction coils 501-510. Voltage regulator 522 is configured to create a usable voltage for charging depleted batteries in an electronic device. Control circuit 524 is configured to manage the charging process for lithium-ion (Li-Ion) or NiMH battery chemistries, etc.) in electronic devices.

Figure 6:
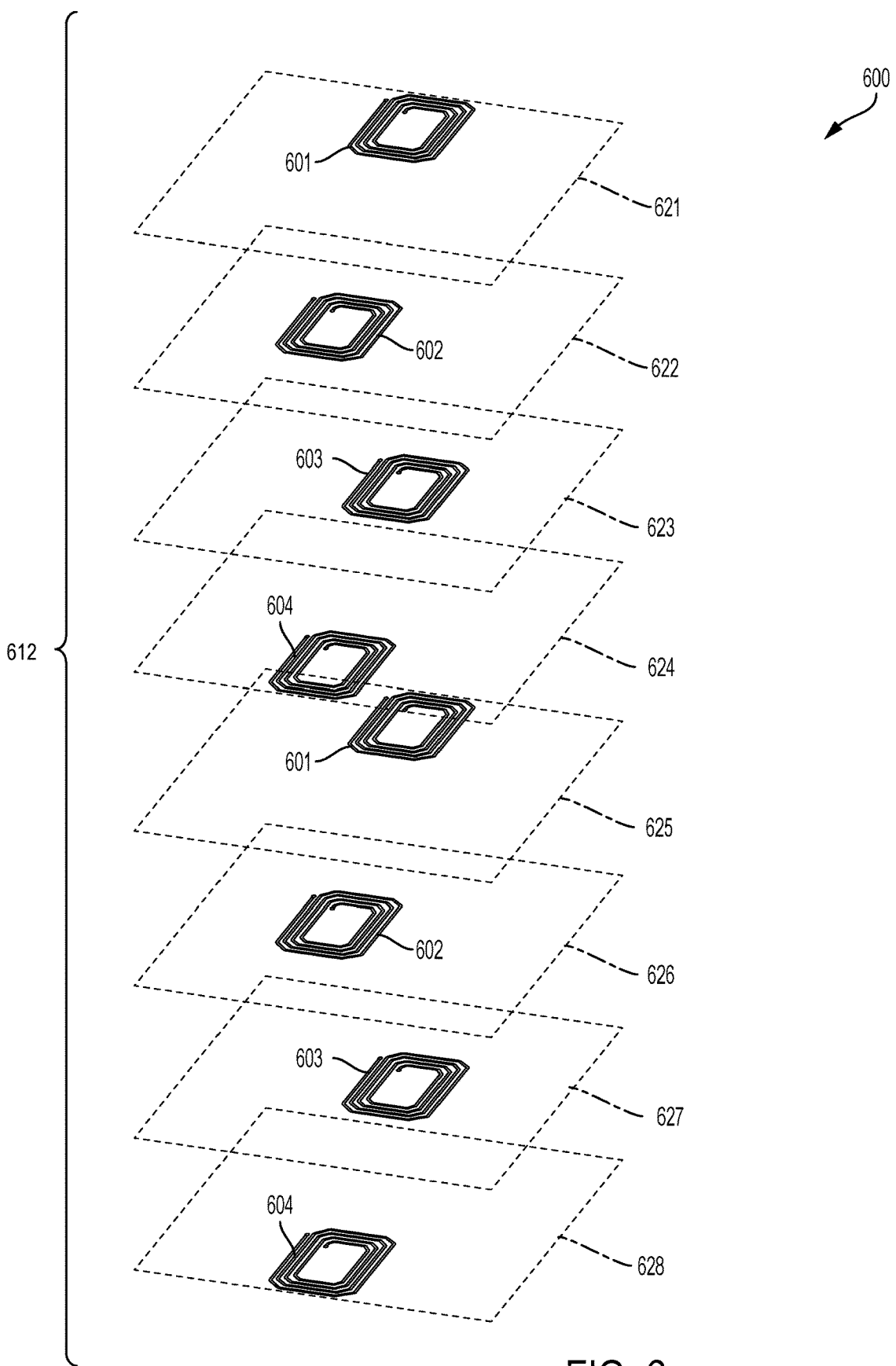
FIG. 6 is an exploded perspective view of an example arrangement of four induction coils on multiple layers of a laminate where sets of windings of each induction coil are disposed on two discrete layers of the laminate.

FIG. 6 is an exploded perspective view 600 of an example arrangement of four induction coils comprising an electrically-conductive material on multiple layers 621-628 of a laminate where sets of windings of each induction coil are disposed on two discrete layers of the laminate. In the implementation illustrated in FIG. 6, the induction coils are labeled 601-604 and are deposited in an HPL laminate structure 612. In one implementation, the HPL laminate structure 612 is composed of eight paper layers 621-628 and one decorative paper layer. The laminate structure 612 may also include optional glue films between the paper layers, particularly if adjacent paper layers are not impregnated with a thermoset resin as described above.

Each of the induction coils 601-604 has eight windings arranged in a repeating, concentric spirangle shape. The induction coils 601-604 are split into an upper portion with four windings above a lower portion also with four windings that together constitute one induction coil. The arrangement 600 provides surprisingly efficient inductive coupling performance for wireless charging in a compact space that takes advantage of the layered structure of a laminate and allows the consumer to advantageously charge their device without need for precise alignment of the electronic device coil with the underlying induction coils of the laminate. No two sets of windings in a common layer (plane) are in electrical contact with one another but rather sets of windings are arranged in a staggered, overlapping manner. The distribution of coils 601-604 among the layers 621-628 in the implementation illustrated by FIG. 6 are shown in Table A.

TABLE A

| Laminate Layer | Induction Coil |
| --- | --- |
| 621 | 601 (upper windings) |
| 622 | 602 (upper windings) |
| 623 | 603 (upper windings) |
| 624 | 604 (upper windings) |
| 625 | 601 (lower windings) |
| 626 | 602 (lower windings) |
| 627 | 603 (lower windings) |
| 628 | 604 (lower windings) |

Other arrangements of induction coils than the arrangement 600 are also possible. A laminate may have more or fewer layers containing sets of windings. The layers containing sets of windings may be separated by insulating layers that do not contain sets of windings. In one implementation, a laminate according to the disclosure may include induction coils having windings located only on a single layer as well as induction coils having sets of windings on discrete layers, i.e., spread across multiple layers (e.g., two, three, or more layers). In one implementation, induction coils that have windings split among more than one layer are not disposed next to each other in adjacent layers. In other words, there is at least one intervening layer between layers containing portions of an induction coil. Arrangement 600 is an example of an induction coil arrangement that does not include portions of a coil disposed on adjacent layers. Induction coils may have more or fewer than eight total windings, depending on the type of coil with which the induction coils 601-604 will inductively couple.

Figure 7:
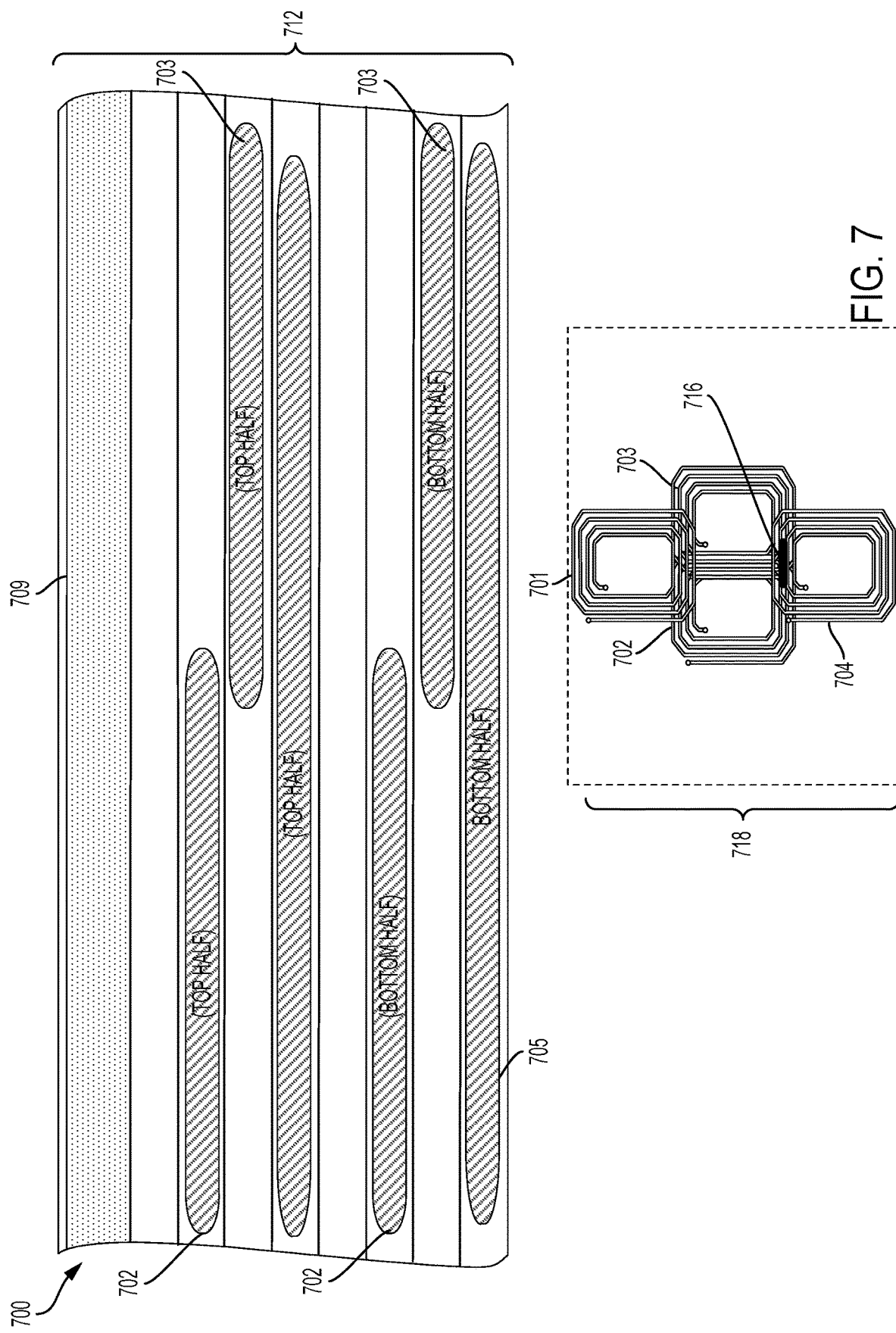
FIG. 7 is a cross-section view of another example arrangement of four induction coils disposed on multiple layers of a laminate where the windings of each induction coil are disposed on two discrete layers of the laminate

FIG. 7 is a cross-section view of another example laminate 700 including four induction coils 701-704 comprising an electrically-conductive material on multiple layers of a laminate where the windings of each induction coil are disposed on two discrete layers of the laminate. A top view 718 illustrates the arrangement of four induction coils. View 718 is a cross-section view of an HPL laminate cut at the line 716/The cross-section view 718 includes a top set of windings and a bottom set of windings of the induction coils 701-704 on different layers of the HPL laminate.

The cross-sectional view further illustrates segments of the sets of windings on different paper layers may be aligned with one another, or orthogonal to each other. The laminate as shown may have a thickness between 0.80 mm and 2.0 mm, for example about 1.3 mm.

Figure 8:
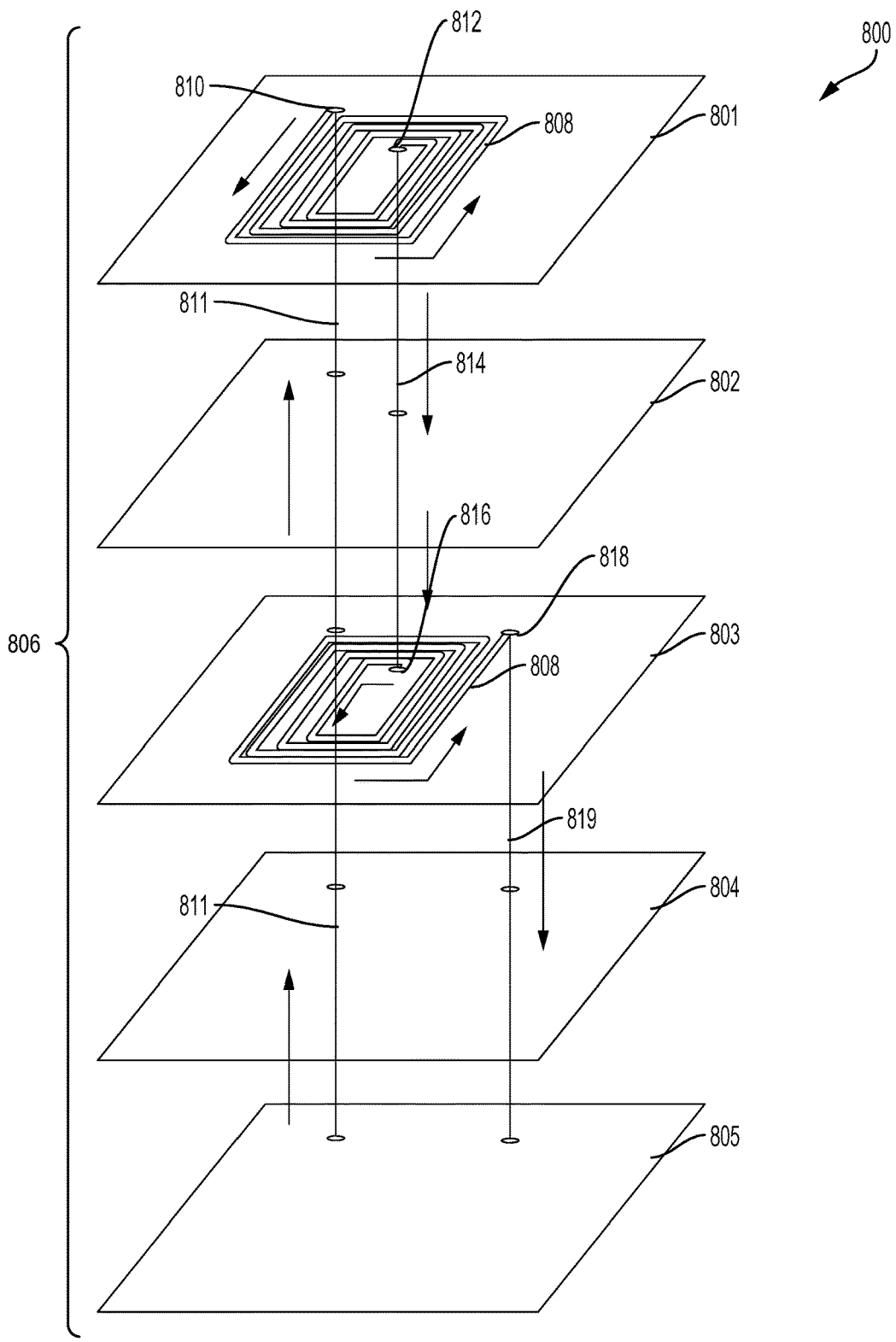
FIG. 8 is a schematic diagram of example positions of vias between layers of a laminate and example directions of current flows through sets of windings of induction coils represented by arrows in the laminate layers electrically connected by the vias.

FIG. 8 is a schematic diagram 800 of example positions of vias between layers of a laminate and example directions of current flows through sets of windings of induction coils represented by arrows in the laminate layers electrically connected by the vias. The sets of windings in a laminate require vias between layers in order to electrically couple the sets of windings to each other so as to form an induction coil. For example, if the windings of an induction coil are distributed among more than one layer, then there must be an electrical connection between any intervening layers, that permits the sets of windings to be arranged in series to form an induction coil. In addition, the induction coils must have electrical connections to connect the induction coils to the driver circuit.

One way of determining the position of a via to connect two sets of windings of an induction coil when the sets of windings are on two different layers of a laminate is for a via to be located near the center of the two respective spirangles. For example, if an induction coil includes two square spirangles of four winds each, then the current flow for the upper four winds begins at a terminus on the perimeter of the square spirangle and "spirals inward" to the end of the fourth, innermost wind. At this point, a via may be sited to connect to a terminus on the end of the innermost wind, which electrically connects the upper four winds of the coil to the lower four winds at an analogous innermost winding location. From there, the current flow continues to "spiral outward" for the lower four winds until the current leaves the coil for another coil or to return to a driver circuit. This current path is referred to herein as a "spiral-in, spiral-out" current path, with the current flowing counter-clockwise in both sets of windings and thus the sets of windings being connected in series.

Any set of windings arranged in a spiraling or spirangle configuration can be connected to the a second set of windings to produce a spiral-in, spiral-out current flow. A terminus at the end of a first coil or set of coil windings need not be in the geometric center of the spirangle but rather can be located at the end of the last winding. Current must be kept flowing in the same circular direction (e.g., clockwise or counter-clockwise) because the direction of current flow determines the direction of the resulting induction field. If current in set of windings flows in the same circular direction, the sets of windings will have an additive effect that increases the strength of the field produced by the resulting induction coil. If current flowed in opposite directions around the coils or sets of windings, then the inductive fields would be in opposite directions and would have a cancelling effect. If a laminate includes more than one coil, then the inductive field of the coils is obviously arranged in the same direction to accomplish wireless charging of an electronic device and thus the current flow is as well.

In one implementation, a coil comprising two sets of windings and having a spiral-in, spiral-out current path comprises a first set of windings with a first terminus on a first paper layer and a second set of windings with a second terminus on a second paper layer. The first and second terminuses share and thus are aligned along a common vertical axis. The first and second terminuses are electrically coupled to one another by a via comprising a conductive material as described herein. Typically, the via is disposed in a hole starting at the second terminus that traverses through any intervening paper layers to the first terminus, such that an electrical connection is established between the first and second terminuses. When the second set of windings and the first set of windings have reflection symmetry (i.e., mirror-image symmetry), a spiral-in, spiral-out current path that allows an additive effect is advantageously achieved.

In the example arrangement illustrated by FIG. 8, five laminate layers 801-805 are arranged into a laminate 806. An induction coil 808 is disposed with sets of windings on layers 801 and 803 with four windings on each layer. The induction coil 808 has a first terminus 810 in the corner of the spirangle on layer 801. First terminus 810 is electrically connected to the rest of an induction drive coil circuit and/or driver circuit through a first via 811. In one implementation, first via 811 is not needed because the first terminus 810 is at the top of the laminate 806 and can be electrically connected to the outside of the laminate 806 due to its location at the top of the laminate 806. In another implementation, it is desired that the driver circuit and other components connected to the induction coil 808 are located below the laminate. If the driver circuit components and/or additional induction coils are located below the laminate 806, the first via extends through layers 801-805 to provide access to the first terminus 810 without the need to locate a wire or other electrical connection above the laminate 806. Keeping the top of the laminate 806 clear from electrical connections and/or charging components may reduce the proximity of electronic devices to the induction coils, thus advantageously improving wireless charging performance and reducing radiative loss of the generated inductive field.

Current flow spirals in around the four windings of induction coil 808 on layer 801 until it reaches the end of the fourth winding at a second terminus 812. At a corresponding location generally under the second terminus 812, a second via 814 is provided. The second via 814 permits connection between the set of four windings of induction coil 808 on layer 801 and the set of four windings of the induction coil 808 located on paper layer 803. As illustrated, the second via is disposed in a hole that traverses through layers 801 and 802 and establishes electrical contact with a third terminus 816 on paper layer 803.

When pressed to form the laminate 806, the via 814 effectively and efficiently establishes electrical connection between the sets of four windings on layers 801 and 803 that constitute the induction coil 808. Current flow spirals counterclockwise from the third terminus 816 outwardly along the four windings on layer 803 until it reaches a fourth terminus 818. Fourth terminus 818 is electrically connected to the rest of an induction drive coil circuit and driver circuit through a third via 819. Current spiraling in on the four windings on layer 801 is in the same direction as current spiraling out on the four windings on layer 803 and therefore the contribution of the two sets of windings to the inductive field are additive and increase the strength of the field.

Figure 9:
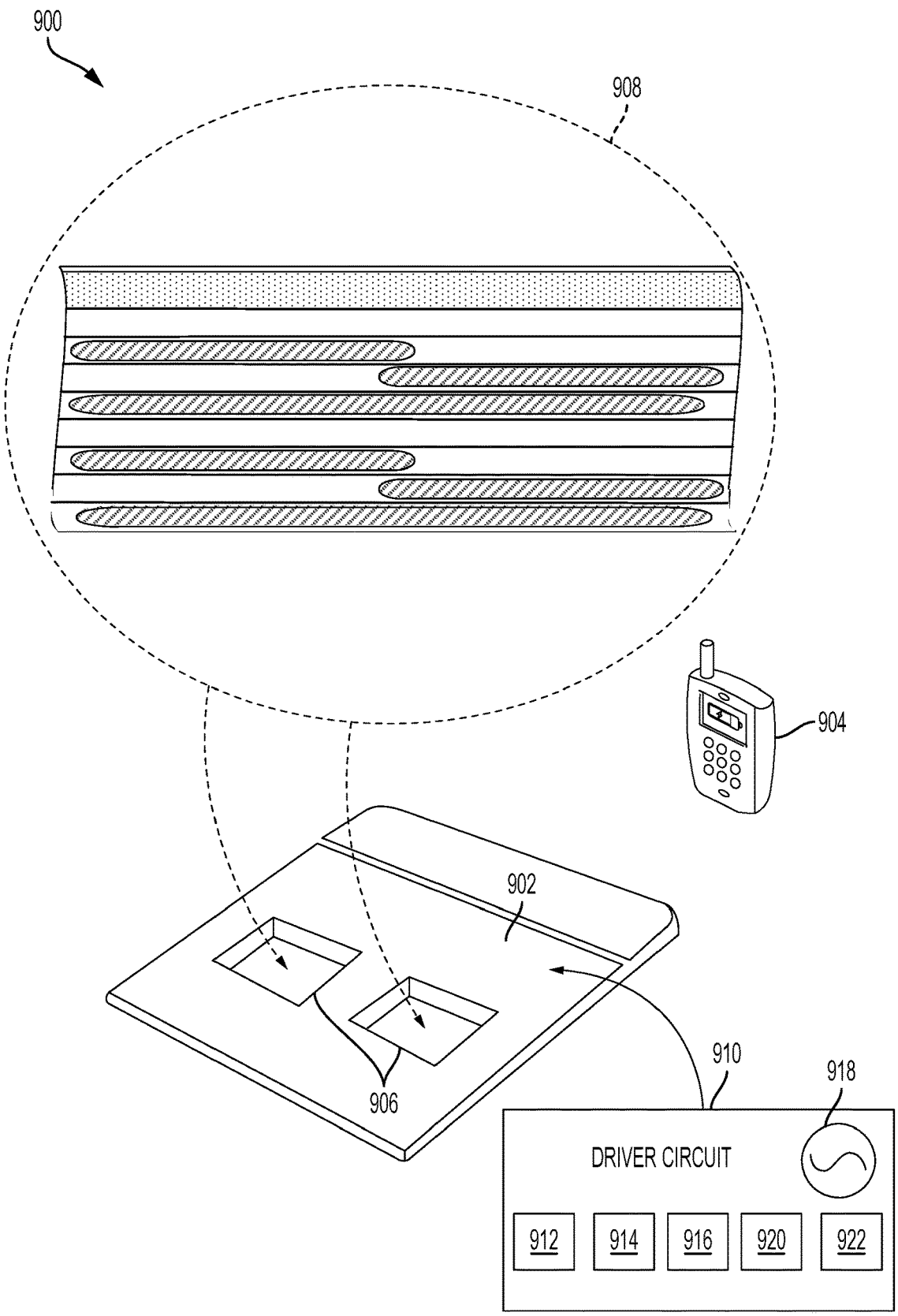
FIG. 9 is a schematic diagram of an example inductive wireless charging station configured to receive a laminate insert including induction coils configured to provide wireless charging as described herein.

FIG. 9 is a schematic diagram of an example inductive wireless charging station 900 configured to receive a laminate insert including induction coils to provide wireless charging. The wireless charging station 900 includes a charging surface 902 onto which a user may place an electronic device 904 for charging. Initially, the wireless charging station 900 does not include a set of induction coils. Instead, the wireless charging station 900 includes two receptacles 906 sized to accept a laminate including one or more induction coils.

Electronic device 904 includes a receiving induction coil to couple with the induction coils in the laminate 908 for the wireless transfer of energy. The electronic device 904 may include without limitation smartphones, laptops, fitness devices, e-readers, or any other type of electronic device that stores power in an on-board battery. If a user of the electronic device 904 places the electronic device 904 on the charging area 902, then the wireless charging station 900 can provide a charge to the electronic device 904. Electronic device 904 may display a charging icon to alert a user of the electronic device 904 that the device is successfully charging on the charging station 900.

Laminates including one or more induction coils may be inserted into the receptacles 906 and controlled by driver circuitry in the charging station 900. A driver circuit 910 is electrically connected to the one or more induction coils in the laminate 908 to perform operations needed to wirelessly charge the electronic device 904. Oscillator 912 is configured to produce a chosen resonant frequency because resonant inductive coupling will not occur unless the sending coil and the receiving coil are tuned to the same frequency. Power transistor 914 serves as an amplifier for driving the induction coils in the laminate 908. Full wave rectifier 916 is configured to convert incoming AC power from power source 918 to a DC value for use in driving the induction coils in the laminate 908. Voltage regulator 920 is configured to create a usable voltage for charging depleted batteries in an electronic device. Control circuit 922 is configured to manage the charging process for lithium-ion (Li-Ion) or NiMH battery chemistries, etc.) in electronic devices.

In one implementation, as shown in FIG. 9, the wireless charging station 900 is included in a larger laminate surface to retrofit the larger laminate surface for wireless inductive charging. A larger laminate surface may be modified by removing a cross-section of the layers in the larger surface (e.g., a number of layers of the laminate are cut out in a shape that will permit installation of a laminate including one or more induction coils. The driver circuit 910 may be retrofitted into the larger laminate surface in a number of manners (e.g., attaching to the bottom of the larger laminate surface, installation in another removed cross-section, etc.).

Figure 10:
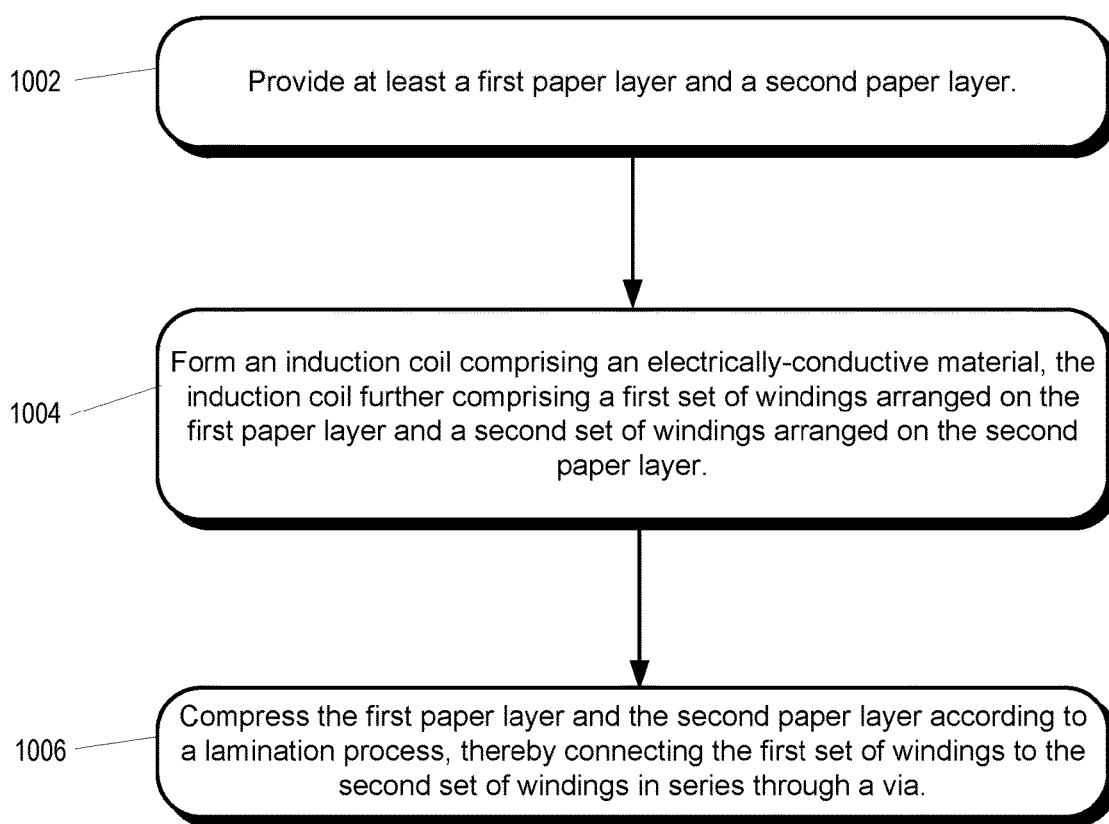
FIG. 10 illustrates example operations for making a laminate with sets of windings on multiple layers of the laminate.
Figure 13:
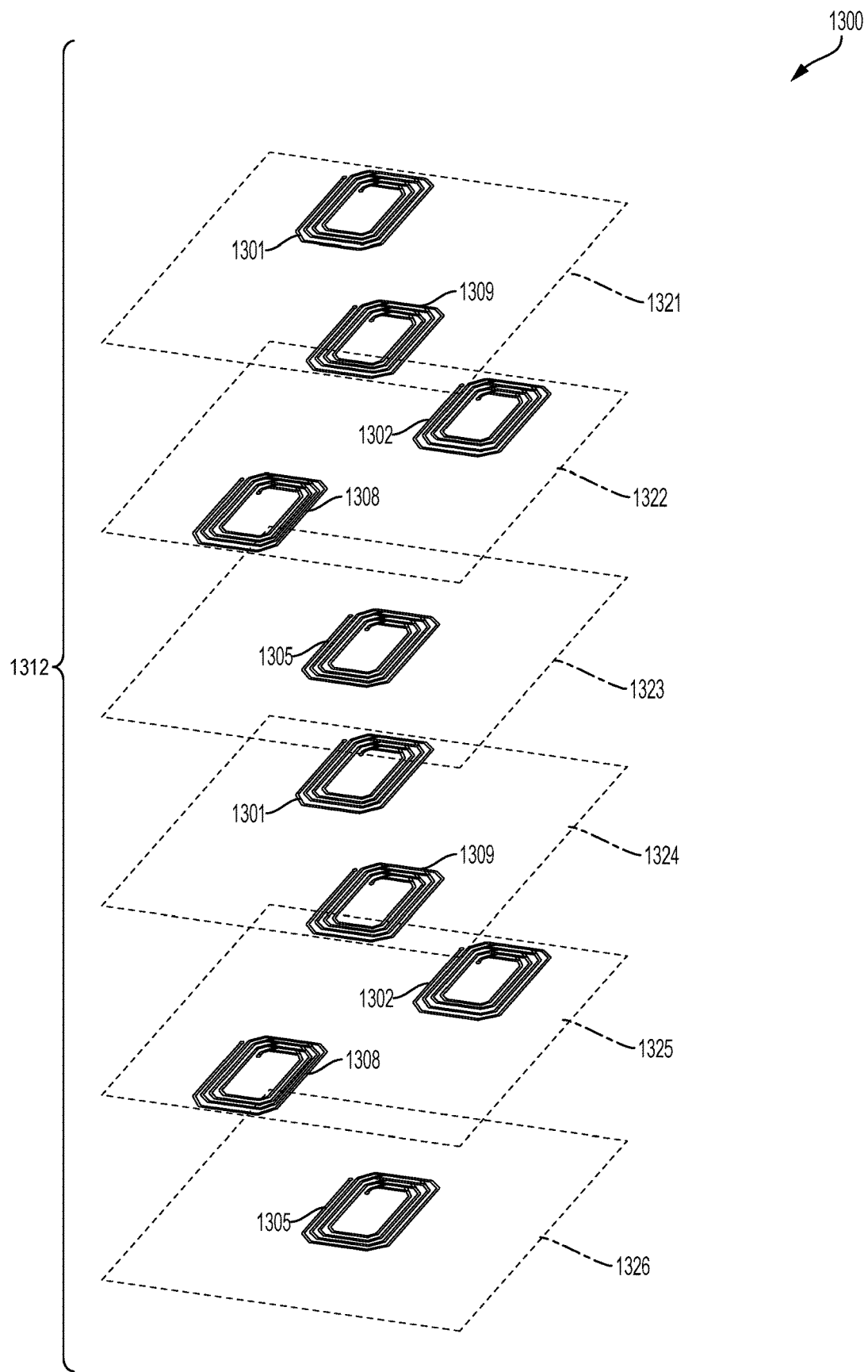
FIG. 13 is an exploded perspective view of an example arrangement of five induction coils comprising an electrically-conductive material on multiple layers of a laminate where sets of windings of each induction coil are disposed on two discrete layers of the laminate.

FIG. 10 illustrates example operations 1000 for making a laminate with sets of windings on multiple layers of the laminate. In operation 1002, a set of laminate layers is provided. In one implementation, the layers in the laminate are sheets of kraft paper impregnated with a resin. One or more decorative layers may be provided. In one implementation, as shown in FIG. 13, six layers of kraft paper are provided. In another implementation, as shown in FIG. 6, eight layers of kraft paper are provided. In other implementations, more or fewer layers can be provided.

A forming operation 1004 forms one or more sets of windings on two or more layers of the laminate. In one implementation, forming operation 1004 deposits an electrically-conductive ink composition on layers of the laminate to form the one or sets of windings. In one implementation, forming operation 1004 forms a single induction coil having windings located on more than one layer of the laminate. In another implementation, forming operation 1004 forms more than one induction coil, with at least one set of windings being located on a different layer than another set of windings. In one implementation, the forming operation 1004 forms induction coils having eight windings each. In other implementations, the forming operation 1004 forms induction coils having more or fewer windings. In at least one implementation, the forming operation 1004 forms four induction coils distributed across eight layers of kraft paper wherein each coil includes four windings on a first sheet of kraft paper and four additional windings on another sheet of kraft paper in the laminate.

After the first and second paper layers (and any other laminate layers) are arranged into a stack, a lamination operation 1006, preferably a high-pressure lamination process, compresses the first paper layer and the second paper layer (and any other laminate layers) and thereby connects at least a first set of windings to a second set of windings in series through a via, the first set of windings and the second set of windings being located on different laminate layers. In operation, once electrically coupled to one another, the first set of windings and the second set of windings are part of the same induction coil, for example an induction coil having eight total windings with four windings located on a first layer of the laminate and four windings located on another layer of the laminate.

The first set of windings may be connected to the second set of windings in lamination operation 1006 by establishing a via between a terminus of the first set of windings and a terminus of the second set of windings. In an implementation, the layer containing the first set of windings is the layer directly above the layer containing the second set of windings and the via need only penetrate one layer. In other implementations, the layer containing the first set of windings is separated from the layer containing the second set of windings by one or more intervening layers and the via must penetrate the one or more intervening layers to connect the first set of windings to the second set of windings.

The lamination operation 1006 may create a via between one or more layers of the laminate by several methods. One way of creating a via between one or more layers of the laminate is to use a masking process. In a masking process, a mask is applied to an untreated sheet of kraft paper in the location of the via before the sheet of kraft paper is impregnated with a resin. After the sheet of kraft paper is treated with a resin, the mask is removed, leaving behind an untreated section of kraft paper where the via is to be created. Then an electrically-conductive ink composition or another electrically-conductive material is deposited on one or more layers of the kraft paper, allowing the electrically-conductive ink or other electrically-conductive material to soak into the fibers of the kraft paper in the location where the mask was provided. An electrically-conductive track is thus formed at the location of the mask, which can penetrate the kraft paper layer thereby electrically connecting the first set of windings to the second set of windings upon lamination.

Another way of creating a via is to form a hole in untreated or resin-impregnated kraft paper at the location of the via. The hole may be made using a cutting tool (e.g., a laser cutting tool), a punching tool, etc., and is located on the kraft paper such that the first set of windings will be in electrical contact with the second set of windings through the hole once electrically-conductive material is disposed therein and the lamination process is performed. A hole may be formed in more than one layer of kraft paper if the first set of windings is separated from the second set of windings by more than one intervening layer. Additional layers separating the windings may also have a hole corresponding to each via, the holes on these layers having also been filled with conductive material, the lamination process 1006 then preferably compresses the laminate according to a high-pressure lamination process.

Figure 11:
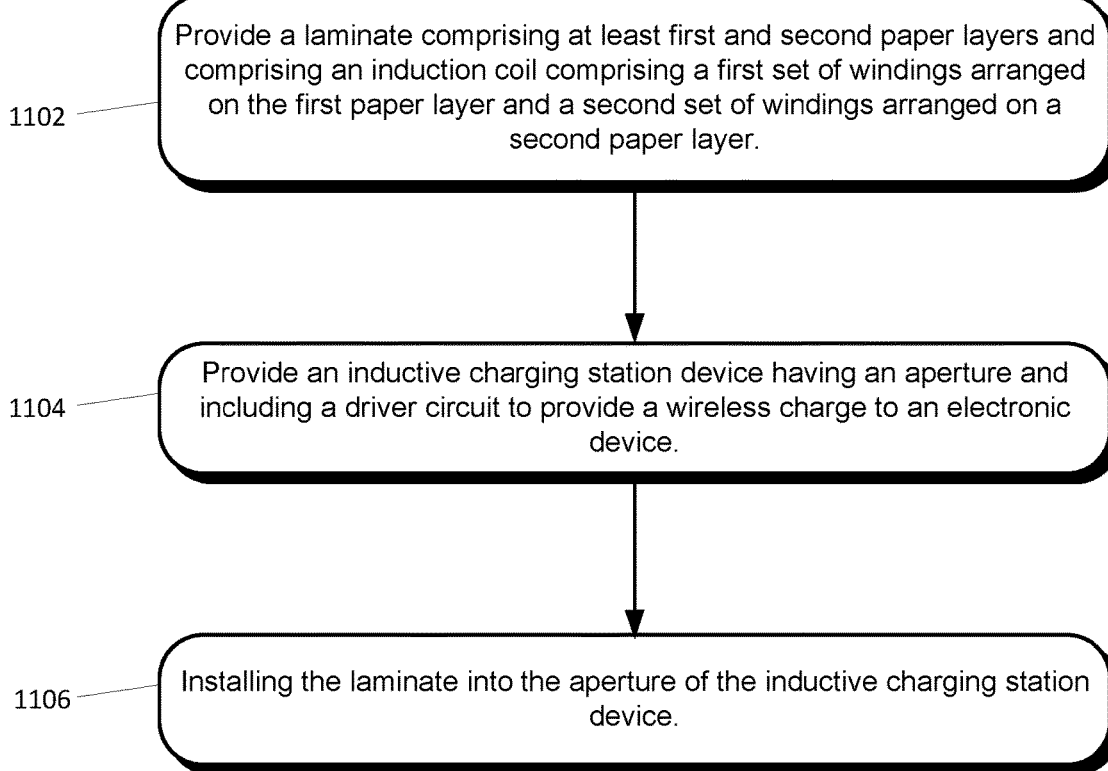
FIG. 11 illustrates example operations for installing a laminate with sets of windings disposed on discrete layers in an inductive wireless charging station.

FIG. 11 illustrates example operations 1100 for installing a laminate with one or more induction coils into an inductive wireless charging station. A providing operation 1102 provides a laminate including induction coils comprising at least one induction coil having first and second sets of windings with the first and second sets of windings being disposed on different paper layers as described herein as described herein. The laminate provided in operation 1102 has at least two electrical contact pads exposed to the outside of the laminate that are in electrical connection with at least one induction coil embedded or enclosed in a layer of the laminate. The providing operation 1102 may be performed in any manner (e.g., manufacturing the laminate, purchasing the laminate, modifying an existing laminate, otherwise providing a laminate, etc.).

A providing operation 1104 provides an inductive charging station device having an aperture and including a driver circuit configured to drive induction coils in a laminate inserted into the aperture of the inductive charging station device. The aperture on the inductive charging station device provided in operation 1104 may be without limitation an aperture in a working surface such as a countertop, a table, or in a device case frame, an aperture in a device case or housing, or an accessible compartment on the device, any of which may be made out of any of a combination of materials (e.g., a plastic, metal, polymer, etc.).

The inductive charging station device provided in providing operation 1104 includes a driver circuit. The driver circuit in the inductive charging station device may include multiple components needed to provide wireless charging to electronic devices. In an implementation, an oscillator is configured to produce a chosen resonant frequency because resonant inductive coupling will not occur unless the sending coil and the receiving coil are tuned to the same frequency. A power transistor serves as an amplifier for driving the induction coils in the installed laminate. A full wave rectifier is configured to convert incoming AC power from a power source to a DC value for use in driving the induction coils in the installed laminate. A voltage regulator s configured to create a usable voltage for charging depleted batteries in an electronic device. A control circuit is configured to manage the charging process for lithium-ion (Li-Ion) or NiMH battery chemistries, etc.) in electronic devices.

An inserting operation 1106 inserts the laminate comprising at least one induction coil having first and second sets of windings with the first and second sets of windings being disposed on different paper layers as described herein into the aperture of the inductive charging station. The inserting operation 1106 may be performed manually or by machine and may be performed at the same time as other operations relating to the assembly of the inductive charging station such as installation of other components of the inductive charging station including components of the device housing, electrical components, the driver circuit, etc.

In another implementation, the inserting operation 1106 is performed by obtaining a laminate surface to retrofit with a laminate including induction coils for inductive charging. A laminate surface (e.g., an existing countertop, existing wall panel, existing interior of a vehicle, etc.) is modified to remove a section of the laminate layers in an area to be used for inductive wireless charging. For example, installing operation 1106 may remove a rectangle-shaped portion of a laminate surface to open a cavity and install the laminate comprising at least one induction coil having first and second sets of windings with the first and second sets of windings being disposed on different paper layers as described herein in the cavity. In one implementation, the installing operation 1106 may leave the top of the laminate with the one or more induction coils flush with the remaining surface of the retrofitted laminate to reduce proximity of the induction coils to charging wireless devices. A coupling operation 1108 is performed after the inserting operation 1106 wherein the at least two contact pads exposed to the outside of the laminate are brought into electrical contact with the driver circuit included in the inductive charging station.

Figure 12:
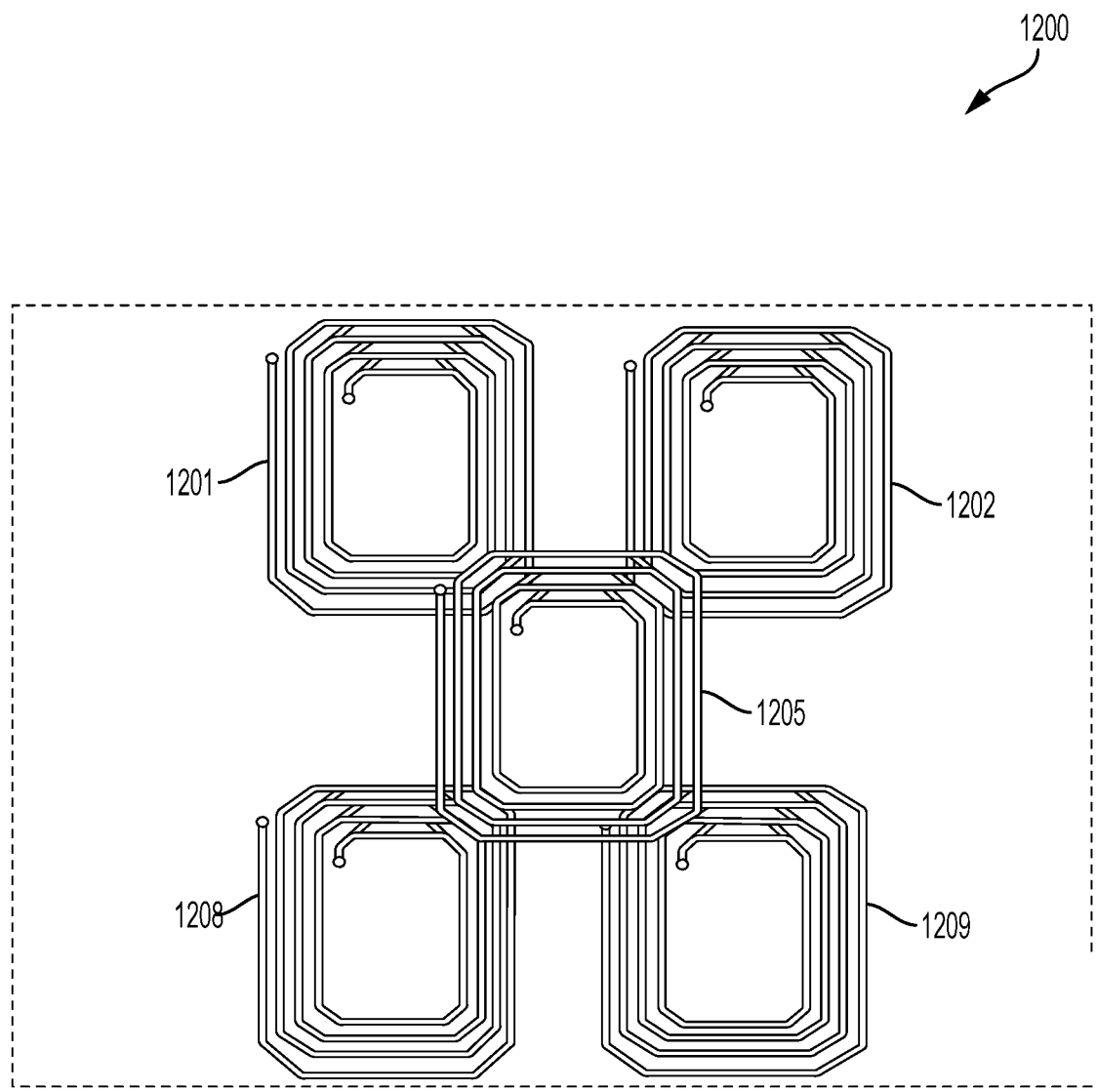
FIG. 12 is a top-down view of an example arrangement of five induction coils, each comprising an electrically-conductive material, the induction coils being disposed on multiple layers of the laminate with the windings of each coil being split among two discrete layers of the laminate.

FIG. 12 is a top-down view of an example arrangement 1200 of five induction coils, 1201-1205, each comprising an electrically-conductive material, the induction coils being disposed on multiple layers of the laminate with the windings of each coil being split among two discrete layers of the laminate. In the example illustrated in FIG. 12, the induction coils 1201-1206 are arranged in a pattern such that the induction coils provide a contiguous wireless electronic device charging area that allows the user to advantageously charge their device without need for precise alignment of the electronic device coil with the underlying induction coils of the inductive charging base station. Each of the induction coils 1201-1205 is comprised of one or more sets of windings, each winding in a set of windings being part of a continuous electrical track forming the set of windings. The induction coils 1201-1205 may be connected to a driver circuit for inductive wireless charging.

FIG. 13 is an exploded perspective view 1300 of an example arrangement of five induction coils comprising an electrically-conductive material on multiple layers 1321-1326 of a laminate where sets of windings of each induction coil are disposed on two discrete layers of the laminate. In the implementation illustrated in FIG. 13, the induction coils are labeled 1301-1305 and are deposited in an HPL laminate structure 1312. In one implementation, the HPL laminate structure 1312 is composed of eight paper layers 1321-1328 and one decorative paper layer. The laminate structure 1312 may also include optional glue films between the paper layers, particularly if adjacent paper layers are not impregnated with a thermoset resin as described above.

Each of the induction coils 1301-1304 has eight windings arranged in a repeating, concentric spirangle shape. The induction coils 1301-1304 are split into an upper portion with four windings above a lower portion also with four windings that together constitute one induction coil. The arrangement 1300 provides surprisingly efficient inductive coupling performance for wireless charging in a compact space that takes advantage of the layered structure of a laminate and allows the consumer to advantageously charge their device without need for precise alignment of the electronic device coil with the underlying induction coils of the laminate. No two sets of windings in a common layer (plane) are in electrical contact with one another but rather sets of windings are arranged in a staggered, overlapping manner. The distribution of coils 1301-1304 among the layers 1321-1328 in the implementation illustrated by FIG. 13 are shown in Table B.

TABLE B

| Laminate Layer | Induction Coil |
| --- | --- |
| 1321 | 1301, 1309 (upper windings) |
| 1322 | 1302, 1308 (upper windings) |
| 1323 | 1305 (upper windings) |
| 1324 | 1301, 1309 (upper windings) |
| 1325 | 1302, 1308 (lower windings) |
| 1326 | 1305 (lower windings) |

Of course, the applications and benefits of the systems, methods and techniques described herein are not limited to only the above examples. Many other applications and benefits are possible by using the systems, methods and techniques described herein.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A laminate for accomplishing wireless power transfer, comprising:
at least first and second paper layers, the second paper layer being disposed above the first paper layer in the laminate;
an insulating layer disposed above the second paper layer;
at least one induction coil comprising an electrically-conductive material, the induction coil further comprising a first set of windings arranged on the first paper layer and a second set of windings arranged on the second paper layer, the first set of windings and the second set of windings being electrically connected in series;
wherein the first paper layer, the second paper layer, and the insulating layer encapsulate the induction coil within the laminate.

2. The laminate of claim 1, further comprising at least a second induction coil, the second induction coil comprising a third set of windings arranged on the first paper layer, the second induction coil further comprising a fourth set of windings arranged on the second paper layer, the third set of windings and the fourth set of windings being electrically connected in series, wherein the first paper layer, the second paper layer, and the insulating layer encapsulate the first and second induction coils within the laminate.

3. The laminate of claim 1, further comprising at least a second induction coil, the second induction coil comprising a third set of windings arranged on a third paper layer and a fourth set of windings arranged on a fourth paper layer, the third set of windings and the fourth set of windings being electrically connected in series, wherein the third paper layer, the fourth paper layer, and the insulating layer encapsulate the second induction coil within the laminate.

4. The laminate of claim 1, wherein the first set of windings and the second set of windings are electrically connected by a via, the via extending between the first paper layer and the second paper layer in the laminate.

5. The laminate of claim 4, wherein the via is disposed in a hole in at least one laminate layer.

6. The laminate of claim 1, wherein the electrically-conductive material comprises particulate electrically-conductive material and at least one of the laminate layers is a resin-impregnated paper.

7. The laminate of claim 1, wherein the laminate comprises a high-pressure laminate.

8. The laminate of claim 1 wherein the first set of windings is electrically connected to the second set of windings by a via connecting an innermost winding of the first set of windings to an innermost winding of the second set of windings.

9. The laminate of claim 1, further comprising a decorative layer disposed above the first paper layer and the second paper layer.

10. The surfacing material for inductively charging electronic devices of claim 1, wherein at least one of the first paper layer and the second paper layer is a resin-impregnated paper.

11. The laminate of claim 1, wherein the first set of windings and the second set of windings are electrically connected by a via, the via being disposed in a hole in at least one layer of the laminate and extending between the first paper layer and the second paper layer in the laminate, the via comprising the electrically-conductive material, and the electrically-conductive material comprises a particulate, electrically-conductive material and a binder.

12. A laminated surfacing material for inductively charging electronic devices comprising:
    at least first and second paper layers, the second paper layer being disposed above the first paper layer;
    an induction coil comprising an electrically-conductive material, the induction coil further comprising a first set of windings arranged on the first paper layer and a second set of windings arranged on the second paper layer, the first set of windings and the second set of windings being electrically connected in series and including at least two electrical contact pads exposed to the outside of the laminated surfacing material; and
    the laminated surface material including a decorative layer disposed above the first paper layer and the second paper layer, the decorative layer not including an induction coil or any winding thereof.

13. The surfacing material for inductively charging electronic devices of claim 12, further comprising at least a second induction coil, the second induction coil comprising a third set of windings arranged on the first paper layer, the second induction coil further comprising a fourth set of windings arranged on the second paper layer, the third set of windings and the fourth set of windings being electrically connected in series, wherein the first paper layer, the second paper layer, and the decorative layer encapsulate the first and second induction coils within the laminated surfacing material.

14. The surfacing material for inductively charging electronic devices of claim 12, further comprising at least a second induction coil, the second induction coil comprising a third set of windings arranged on a third paper layer and a fourth set of windings arranged on a fourth paper layer, the third set of windings and the fourth set of windings being electrically connected in series, wherein the third paper layer, the fourth paper layer, and the decorative layer encapsulate the second induction coil within the laminated surfacing material.

15. The surfacing material for inductively charging electronic devices of claim 12, wherein the induction coil is electrically connected to at least two electrical contact pads exposed to the outside of the laminate, and wherein the at least two electrical contact pads exposed to the outside of the laminate are located on the bottom of the laminate, the at least two electrical contact pads connected to the outside of the laminate through vias.

16. The surfacing material for inductively charging electronic devices of claim 12, wherein at least one of the first set of windings and the second set of windings is in the shape of a spirangle.

17. The surfacing material for inductively charging electronic devices of claim 12, further including one or more insulating paper layers, the insulating paper layers not including induction coils or any portions thereof, and the insulating paper layers being arranged between paper layers that do include induction coils.

18. A method of making a laminated surface material, the method comprising:
    providing at least a first paper layer and a second paper layer;
    forming an induction coil comprising an electrically-conductive material, the induction coil further comprising a first set of windings arranged on the first paper layer and a second set of windings arranged on the second paper layer;
    compressing the first paper layer and the second paper layer according to a lamination process, thereby connecting the first set of windings to the second set of windings in series through a via, the via extending from the first paper layer to the second paper layer.

19. The method of claim 18, further comprising:
    connecting a driver circuit to the induction coil.

20. The method of claim 18, further comprising:
    charging an electronic device by driving a driver circuit to drive electricity through the plurality of induction coils.

\* \* \* \* \*